(12) United States Patent
Taptič et al.

(10) Patent No.: US 11,290,186 B2
(45) Date of Patent: Mar. 29, 2022

(54) MODULAR ELECTROMAGNETIC ANTENNA ASSEMBLIES AND METHODS OF ASSEMBLING AND/OR DISASSEMBLING

(71) Applicant: RF Elements S.R.O., Bratislava (SK)

(72) Inventors: Juraj Taptič, Zálesie (SK); Martin Marcinčák, Humenné (SK)

(73) Assignee: RF ELEMENTS S.R.O., Bratislava (SK)

(*) Notice: Subject to any disclaimer, the term of this patent is extended or adjusted under 35 U.S.C. 154(b) by 0 days.

(21) Appl. No.: 16/997,982

(22) Filed: Aug. 20, 2020

(65) Prior Publication Data
US 2020/0382213 A1 Dec. 3, 2020

Related U.S. Application Data

(63) Continuation of application No. 15/981,245, filed on May 16, 2018, now Pat. No. 10,778,333.
(Continued)

(51) Int. Cl.
*H01Q 1/12* (2006.01)
*H04B 10/2575* (2013.01)
(Continued)

(52) U.S. Cl.
CPC ....... *H04B 10/25752* (2013.01); *G05D 1/042* (2013.01); *H01P 5/024* (2013.01);
(Continued)

(58) Field of Classification Search
CPC ...... H01Q 1/12; H01Q 1/1207; H01Q 1/1228; H01Q 1/246; H01Q 13/02; H01Q 13/0283; H01Q 19/12; H01P 5/024; H04B 10/25752
See application file for complete search history.

(56) References Cited

U.S. PATENT DOCUMENTS

| 2,892,987 A | 6/1959 | Cedrone |
| 3,019,041 A | 1/1962 | Scheublein |

(Continued)

FOREIGN PATENT DOCUMENTS

| CN | 202067885 | 12/2011 |
| GB | 2540002 | 4/2017 |

(Continued)

OTHER PUBLICATIONS

Chinese Office Action dated Oct. 30, 2019 from corresponding Chinese Patent Application No. CN201810474825.5, 14 pages.
(Continued)

*Primary Examiner* — Hoang V Nguyen
(74) *Attorney, Agent, or Firm* — Ohlandt, Greeley, Ruggiero and Perle, LLP

(57) ABSTRACT

A modular electromagnetic antenna assembly configured for securement to a structure is provided. The assembly includes an antenna, a radio, and a base. The base has a bracket securable to the structure and the base has at least one feed. The radio and base together form a waveguide that transmits radio waves between the radio and the antenna. The radio is removably secured to the base so as to form a removable mechanical connection to the base and a removable communication connection with the at least one feed through the base.

20 Claims, 35 Drawing Sheets

Related U.S. Application Data

(60) Provisional application No. 62/507,663, filed on May 17, 2017, provisional application No. 62/507,657, filed on May 17, 2017.

(51) Int. Cl.
  *H01Q 13/02* (2006.01)
  *G05D 1/04* (2006.01)
  *H01Q 19/12* (2006.01)
  *H01Q 1/24* (2006.01)
  *H01P 5/02* (2006.01)

(52) U.S. Cl.
  CPC ......... *H01Q 1/1207* (2013.01); *H01Q 1/1228* (2013.01); *H01Q 1/246* (2013.01); *H01Q 13/02* (2013.01); *H01Q 13/0283* (2013.01); *H01Q 19/12* (2013.01)

(56) References Cited

U.S. PATENT DOCUMENTS

| | | | |
|---|---|---|---|
| 3,039,797 A | 6/1962 | Harper |
| 3,241,144 A | 3/1966 | Berger |
| 3,512,162 A | 5/1970 | Siebold |
| 3,898,666 A | 8/1975 | Massa |
| 3,987,452 A | 10/1976 | Godet |
| 4,157,876 A | 6/1979 | DiGiulio |
| 4,515,336 A | 5/1985 | Fischer |
| 4,623,858 A | 11/1986 | Montesanto |
| 4,755,830 A | 7/1988 | Plunk |
| 5,402,139 A | 3/1995 | Maeshima |
| 5,790,910 A | 8/1998 | Haskin |
| 5,835,068 A | 11/1998 | Paul |
| 5,867,132 A | 2/1999 | Blasing |
| 5,870,062 A | 2/1999 | Cox |
| 6,045,103 A | 4/2000 | Costa |
| 6,140,893 A | 10/2000 | Sciarrino |
| 6,302,447 B1 | 10/2001 | Lee |
| 6,535,177 B1 | 3/2003 | Dhellemmes |
| 6,664,937 B2 | 12/2003 | Vermette |
| 6,911,950 B2 | 6/2005 | Harron |
| 7,142,168 B1 | 11/2006 | Sinclair |
| 7,265,732 B2 | 9/2007 | Lin |
| 7,439,930 B2 | 10/2008 | Bury |
| 7,748,670 B1 | 7/2010 | Veldez |
| 7,954,777 B2 | 6/2011 | Bohm |
| 8,009,112 B2 | 8/2011 | Buer |
| 8,804,622 B1 | 8/2014 | Thai |
| 8,816,799 B2 | 8/2014 | Nealis |
| 9,225,071 B2 | 12/2015 | Lee |
| 9,401,536 B2 | 7/2016 | Haluba |
| 9,634,373 B2 | 4/2017 | Lee |
| 9,912,034 B2 | 3/2018 | Sanford |
| 2002/0084396 A1 | 7/2002 | Weaver |
| 2002/0105475 A1* | 8/2002 | Overton ................ H01Q 19/13 343/878 |
| 2002/0125971 A1 | 9/2002 | Sciarrino |
| 2003/0090820 A1 | 5/2003 | Matsuura |
| 2005/0024276 A1 | 2/2005 | Izumi |
| 2005/0127261 A1 | 6/2005 | Lin |
| 2008/0121767 A1 | 5/2008 | Wimberley |
| 2008/0165076 A1 | 7/2008 | Pan |
| 2010/0066463 A1 | 3/2010 | Rosenberg |
| 2010/0066633 A1 | 3/2010 | Singer |
| 2010/0081373 A1 | 4/2010 | Rao |
| 2010/0315306 A1 | 12/2010 | Strydesky |
| 2014/0315408 A1 | 10/2014 | Colapietro |
| 2016/0028141 A1 | 1/2016 | Shimizu |
| 2016/0104929 A1* | 4/2016 | Taptic .................... H01Q 13/02 343/781 R |
| 2016/0352376 A1 | 12/2016 | Shimizu |

FOREIGN PATENT DOCUMENTS

| | | |
|---|---|---|
| JP | 2006-345015 | 12/2006 |
| WO | 2014/188675 | 11/2014 |
| WO | 2017/044986 | 3/2017 |

OTHER PUBLICATIONS

Extended European Search Report dated Oct. 12, 2018 in corresponding European Patent Application No. 18172831.2, 7 pages.

* cited by examiner

MODULAR ELECTROMAGNETIC ANTENNA ASSEMBLIES AND METHODS OF ASSEMBLING AND/OR DISASSEMBLING

CROSS REFERENCE TO RELATED APPLICATIONS

This application is a continuation of U.S. application Ser. No. 15/981,245 filed on May 16, 2018, which issued as U.S. Pat. No. 10,978,333 on Sep. 15, 2020, which claims the benefit of U.S. Application 62/507,657 filed May 17, 2017 and claims the benefit of U.S. Application 62/507,663 also filed May 17, 2017, the entire contents of all of which are incorporated by reference herein.

BACKGROUND

1. Field of the Disclosure

The present disclosure generally relates to electromagnetic antenna assemblies. More specifically, the present disclosure relates to electromagnetic antenna assemblies that are modular and to methods of assembling such assemblies.

2. Description of Related Art

The generation, transmission, and reception of electromagnetic waves are common technological issues in the communications, antenna, radar, and microwave fields. Generally, such fields require an electromagnetic transmitter or receiver ("radio") and an antenna in communication by way of a waveguide. Thus, many assemblies of radio, waveguide, and antenna are known.

In wireless telecommunications, the network is accessed via access point or base station antennas that cover certain geographical area. To increase the throughput and to mitigate interference, network operators have to perform perpetual adjustments in network design to address the requirements—to scale the network. Scalable wireless communication network requires ability to decrease the area of access point coverage by narrowing down the radiation angle of the antenna (also described as "decreasing the size of the cell" in cellular networks), increase the amount of access points in the given area while considering limited spectrum. This process is often performed together with upgrade of radio technology for better spectrum efficiency (e.g., 802.11n to 802.11ac, 3G to 4G, 4G to 5G, and others). The requirement for more network throughput from a given area is delivered by increased density of access points as a result of more narrow radiation of the antennas, increased amount of access points, improved spectral efficiency of radio equipment (upgrade of technology), and combinations thereof.

SUMMARY

It has been determined by the present disclosure that there is a need for the ability to easily swap the antenna at existing access points to change the radiation properties of the access point, there is the need for the ability to easily swap of the radio at existing access point to upgrade, repair or maintain the radio, and there is the need for the ability to easily add new access point on the mast/telecommunication infrastructure when additional capacity is needed. The upgrading, maintenance and repair of such prior art assemblies has been found by the present disclosure to often require multiple skilled trades (e.g., electricians, technicians, mechanical assemblers, etc.) that add to the cost and complexity of maintaining and repairing the assemblies. It is to be mentioned, that due to the nature of wireless networks and elevated telecommunication infrastructure, people's safety when performing maintenance, installation or repair is always of concern.

It has also been determined by the present disclosure that the prior art assemblies do not reflect above mentioned requirements in their design of particular equipment, nor in the method how the equipment should be deployed or used. As an example, antenna mounts are usually very complicated mechanical structures, that do not allow for easy installation or swapping of antenna. The most common antenna types used as access point antennas do not even allow for variety of radiation beam widths. Radios are often mounted directly on the antenna, or antennas are mounted directly on the radio, therefore maintaining any of those two units often requires dis-assembling of the whole access point. That causes loss of elevation and azimuth settings, which is critical for access point function, and it also adds time, cost, complexity and network outage in a significant manner. It also always requires highly qualified personnel to perform the job every time maintenance, installation, upgrade or repair is needed.

It has further been determined by the present disclosure that there is a need for electromagnetic antenna assemblies and methods of assembling that eliminate the complexity, highly skilled workforce, cost, opportunity for error and the like associated with the unsealing—disconnecting—reconnecting—resealing of RF cables, electrical cables, and data cables and them whenever it is desired to replace the current radio with a new radio.

Therefore, it has been determined by the present disclosure that there is a continuing need for electromagnetic antenna assemblies and methods that overcome, alleviate, and/or mitigate one or more of the issues of prior art assemblies and methods.

A modular electromagnetic antenna assembly configured for securement to a structure is provided. The assembly includes an antenna, a radio, and a base. The base has a bracket securable to the structure and the base has at least one feed. The radio and base together form a waveguide that transmits radio waves between the radio and the antenna. The radio is removably secured to the base so as to form a removable mechanical connection to the base and a removable communication connection with the at least one feed through the base.

In some embodiments either alone or together with any one or more of the aforementioned and/or after-mentioned embodiments, the antenna also includes a portion that together with the radio and base forms the waveguide.

In some embodiments either alone or together with any one or more of the aforementioned and/or after-mentioned embodiments, the antenna is removably secured to the base.

In some embodiments either alone or together with any one or more of the aforementioned and/or after-mentioned embodiments, the base includes couplings at opposite ends configured to removably connect the radio and the antenna to the opposite ends of the base.

In some embodiments either alone or together with any one or more of the aforementioned and/or after-mentioned embodiments, the couplings are identical or different.

In some embodiments either alone or together with any one or more of the aforementioned and/or after-mentioned embodiments, the at least one feed is an electrical feed, a data feed, one or more direct current electrical feeds, one or more data feeds, one or more fiber optic data feeds, and any combinations thereof.

In some embodiments either alone or together with any one or more of the aforementioned and/or after-mentioned embodiments, the base and/or the radio includes circuitry for conversion of a fiber optic data signal to an electrical data signal.

In some embodiments either alone or together with any one or more of the aforementioned and/or after-mentioned embodiments, the antenna is a parabolic dish antenna or a horn antenna having an open end with or without a cover that is transparent to radio waves.

A method of assembling a modular electromagnetic antenna assembly is also provided. The method includes the steps of mechanically securing a base on a structure, the base being secured to an antenna; placing the base in communication with at least one feed; and removably securing a radio to the base so that the radio and the base together form a waveguide that transmits radio waves between the radio and the antenna and so that the radio is in communication with the at least one feed.

In some embodiments either alone or together with any one or more of the aforementioned and/or after-mentioned embodiments, the step of removably securing the radio to the base further includes securing the radio and the base so that a portion of the antenna together with the radio and the base form the waveguide.

In some embodiments either alone or together with any one or more of the aforementioned and/or after-mentioned embodiments, the step of securing the radio to the base includes controlling a drone to install the radio to the base.

In some embodiments either alone or together with any one or more of the aforementioned and/or after-mentioned embodiments, the step of controlling the drone includes flying the drone to install the radio to the base, climbing the drone up the structure to install the radio to the base, or raising the drone to install the radio to the base.

In some embodiments either alone or together with any one or more of the aforementioned and/or after-mentioned embodiments, the method further includes the step of removably securing the antenna to the base.

In some embodiments either alone or together with any one or more of the aforementioned and/or after-mentioned embodiments, the step of securing the antenna to the base includes controlling a drone to install the antenna to the base.

In some embodiments either alone or together with any one or more of the aforementioned and/or after-mentioned embodiments, the step of controlling the drone includes flying the drone to install the antenna to the base, climbing the drone up the structure to install the antenna to the base, or raising the drone to install the antenna to the base.

A modular electromagnetic antenna assembly configured for securement to a structure is also provided that includes a base, an antenna, and a radio. The base has a bracket securable to the structure. The antenna is removably secured to a first end of the base. The radio is removably secured to a second end of the base. The radio and base together form a waveguide that transmits radio waves between the radio and the antenna.

In some embodiments either alone or together with any one or more of the aforementioned and/or after-mentioned embodiments, the antenna further includes a portion that together with the radio and base forms the waveguide.

In some embodiments either alone or together with any one or more of the aforementioned and/or after-mentioned embodiments, the base includes at least one feed. The radio is removably secured to the base so as to form a removable communication connection with the at least one feed through the base.

In some embodiments either alone or together with any one or more of the aforementioned and/or after-mentioned embodiments, the at least one feed includes one or more feeds selected from the group consisting of an electrical feed, a data feed, a direct current electrical feed, a fiber optic data feed, and any combinations thereof.

In some embodiments either alone or together with any one or more of the aforementioned and/or after-mentioned embodiments, the base includes a first coupling at the first end and a second coupling at the second end. The first and second couplings being configured to removably connect the radio and the antenna, respectively, to the base.

The above-described and other features and advantages of the present disclosure will be appreciated and understood by those skilled in the art from the following detailed description, drawings, and appended claims.

DETAILED DESCRIPTION

Figure 1:
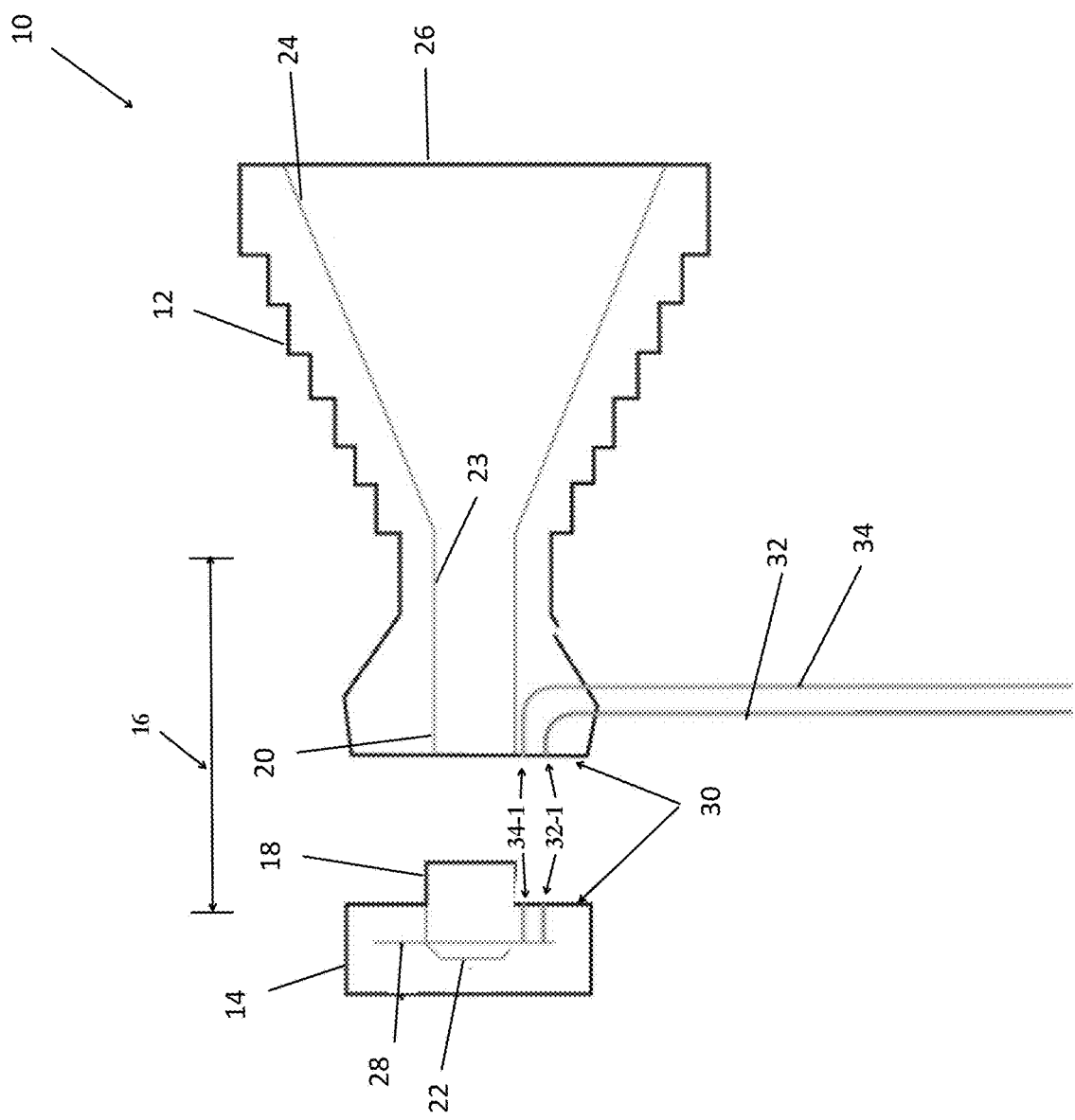
FIG. 1 is a schematic depiction of an exemplary embodiment of an electromagnetic antenna assembly according to the present disclosure.

Referring now to the figures, and in particular to FIG. 1, an exemplary embodiment of a modular antenna assembly according to the present disclosure is shown and is generally referred to by reference numeral 10. Assembly 10 includes an antenna 12 and a radio 14 connected by a waveguide 16. In use, assembly 10 is configured so that antenna 12 is used to transmit/receive (hereinafter "transmit") radio waves to/from radio 14 via waveguide 16.

Waveguide 16 is formed by portions 18, 20, closed end 22, and any symmetrical portion 23 (i.e., cylindrical, square, etc.) of antenna 12 up to open end 24. In the illustrated embodiment, open end 24 is shown as being flared into an open-ended conical or pyramidal shaped horn. Of course, it is contemplated by the present disclosure for open end 24 to have any desired shape such as, but not limited to, a parabolic shape, a dish shape, a planar shape, and others. In some embodiments, open end 24 includes a cover 26 that is transparent to radio waves.

Radio 14 includes a circuit board 28 that communicates radio waves with waveguide 16 via one or more probes (not shown) projecting into the waveguide at closed end 22 to form a quarter-wave monopole antenna.

Assembly 10 includes a coupling 30 that forms an electromagnetic connection between portions 18, 20 so that the RF signal flows on the inside volume of waveguide 16 and passes across the coupling, preferably without reflection or loss, between antenna 12 and radio 14.

Assembly 10 includes one or more of a power feed 32 and a data feed 34 that are in communication with radio 14. Advantageously and contrary to prior art designs, coupling 30 of the present disclosure is also configured so that feeds 32, 34 enter assembly 10 through antenna 12 and are transmitted through the coupling to radio 14. Thus, assembly 10 is configured to feed power and/or data through antenna 12 to radio 14—namely to place the radio in communication with the feeds 32 and/or 34 through the base.

In some embodiments, power feed 32 can be one or more direct current electrical feeds (e.g. 0-60 volts) and data feed 34 can be one or more ethernet feeds and/or one or more fiber optic feeds. In embodiments where data feed 34 is a fiber optic data feed, base 36 and/or radio 14 can include circuitry configured to convert the fiber optic data signal to an electrical data signal for use by the radio.

In some embodiments, coupling 30 includes power and data connectors 32-1, 34-2, respectively, that form a physical connection to transmit power/data from antenna 12 to radio 14. In other embodiments, radio 14 can be a sealed unit with coupling 30 including wireless transmission devices for transmitting power/data from antenna 12 to radio 14. For example, coupling 30 can be configured to inductively transmit power from antenna 12 to radio 14 and can be configured to optically transmit data from the antenna to the radio. Of course, other means of wirelessly communicating power/data from antenna 12 to radio 14 are contemplated as being within the scope of the present application.

Without wishing to be bound by any particular theory, assembly 10 is believed to allow greater design and upgrade capability than available in the prior art. Here, antenna 12 forms the basis of the assembly with all power and data connections being connected thereto. In this manner, replacement or retrofitted of radio 14 can occur with only a simple use of coupling 30. Moreover, the replacement or retrofitting of radio 14 can be accomplished without the need for electricians or data technicians since the simple process of using coupling 30 to form the mechanical connection between antenna 12 and radio 14 also forms the electrical and data connection. Hence, assembly 10 is referred to as being "modular" in that replacement of radio 14 can be accomplished with only mechanical interconnection between the radio and antenna 12.

Coupling 30 can form a mechanical connection between antenna 12 and radio 14 in any desired manner. For example, coupling 30 can be a mechanical connection such as, but not limited to, those described in Applicant's own U.S. application Ser. No. 14/879,266 and Applicant's own U.S. application Ser. No. 15/587,079 (the '079 application), the entire contents of both of which are incorporated by reference herein.

Figure 2:
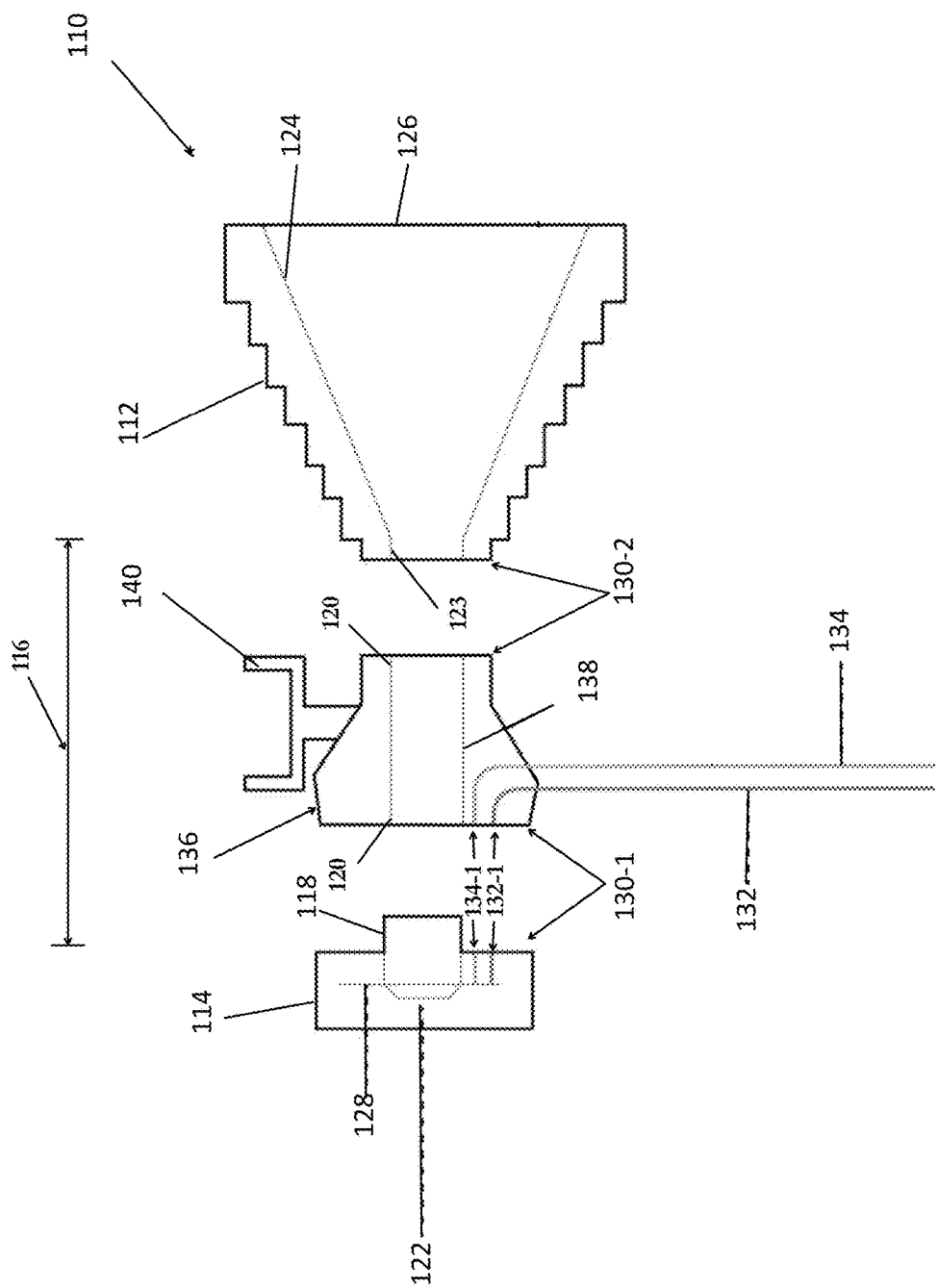
FIG. 2 is a schematic depiction of an alternate exemplary embodiment of an electromagnetic antenna assembly according to the present disclosure.

Referring now to FIG. 2, alternate exemplary embodiments of a modular assembly according to the present disclosure is shown and is referred to using reference numeral 110.

Assembly 110 includes an antenna 112, a radio 114, and a base 136 that form a waveguide 116. In use, assembly 110 is configured so that antenna 112 is used to transmit radio waves to/from radio 114 via waveguide 116.

Waveguide 116 is formed by end portions 118, 120, closed end 122, central portion 138, and any symmetrical portion 123 (i.e., cylindrical, square, etc.) of antenna 112 up to open end 124. In the illustrated embodiment, open end 124 is shown as being flared into an open-ended conical or pyramidal shaped horn. In some embodiments, open end 124 includes a cover 126 that is transparent to radio waves.

Radio 114 includes a circuit board 128 that communicates radio waves with waveguide 116 via one or more probes (not shown) projecting into the waveguide at closed end 122 to form a quarter-wave monopole antenna.

Assembly 110 includes a pair of couplings 130-1, 130-2 that form an electromagnetic connection between portions 118, 138 and portions 120, 138, respectively, so that the RF signal flows on the inside volume of waveguide 116 and passes across the couplings, preferably without reflection or loss, between antenna 112 and radio 114 through base 136.

Base 136 includes a bracket 140 that allows the base to be secured in position on a desired structure (not shown).

Assembly 110 includes one or more of a power feed 132 and a data feed 134 that are in communication with base 136. Advantageously and contrary to prior art designs, coupling 130-1 of the present disclosure is also configured so that feeds 132, 134 enter assembly 110 through base 136 and are transmitted through the coupling to radio 114. Thus, assembly 110 is configured to feed power and/or data through base 136 to radio 114—namely to place the radio in communication with the feeds 132 and/or 134 through the base.

In some embodiments, coupling 130-1 includes power and data connectors 132-1, 134-2, respectively that form a physical connection to transmit power/data from base 136 to radio 114. In other embodiments, radio 114 can be a sealed unit with coupling 130-1 including wireless transmission devices for transmitting power/data from base 136 to radio 114. For example, coupling 130-1 can be configured to inductively transmit power from base 136 to radio 114 and can be configured to optically transmit data from the antenna to the radio. Of course, other means of wirelessly communicating power/data from base 136 to radio 114 are contemplated as being within the scope of the present application.

Without wishing to be bound by any particular theory, assembly 110 is believed to allow greater design and upgrade capability than available in the prior art. Here, base 136 forms the basis of the assembly 110 with all power and data connections being connected thereto. In this manner, replacement or retrofitted of antenna 112 and/or radio 114 can occur with only a simply use of couplings 130-1, 130-2. Moreover, the replacement or retrofitting of antenna 112 and/or radio 114 can be accomplished without the need for electricians or data technicians since the simple process of using coupling 130-1 to form the mechanical connection between base 136 and radio 114 also forms the electrical and data connection and the simple process of using coupling 130-2 to form the mechanical connection between base 136 and antenna 112.

Hence, assembly 110 is also referred to as being "modular" in that replacement of antenna 112 and/or radio 114 can be accomplished with only mechanical interconnection between these components and base 136.

Couplings 130-1, 130-2 can form a mechanical connection between antenna 112 and base 136 and between radio 114 and base 136 in any desired manner. For example, couplings 130-1, 130-2 can be a mechanical connection such as, but not limited, to those described in Applicant's own U.S. application Ser. No. 14/879,266 and Applicant's own U.S. application Ser. No. 15/587,079, the entire contents of both of which are incorporated by reference herein.

Figure 3:
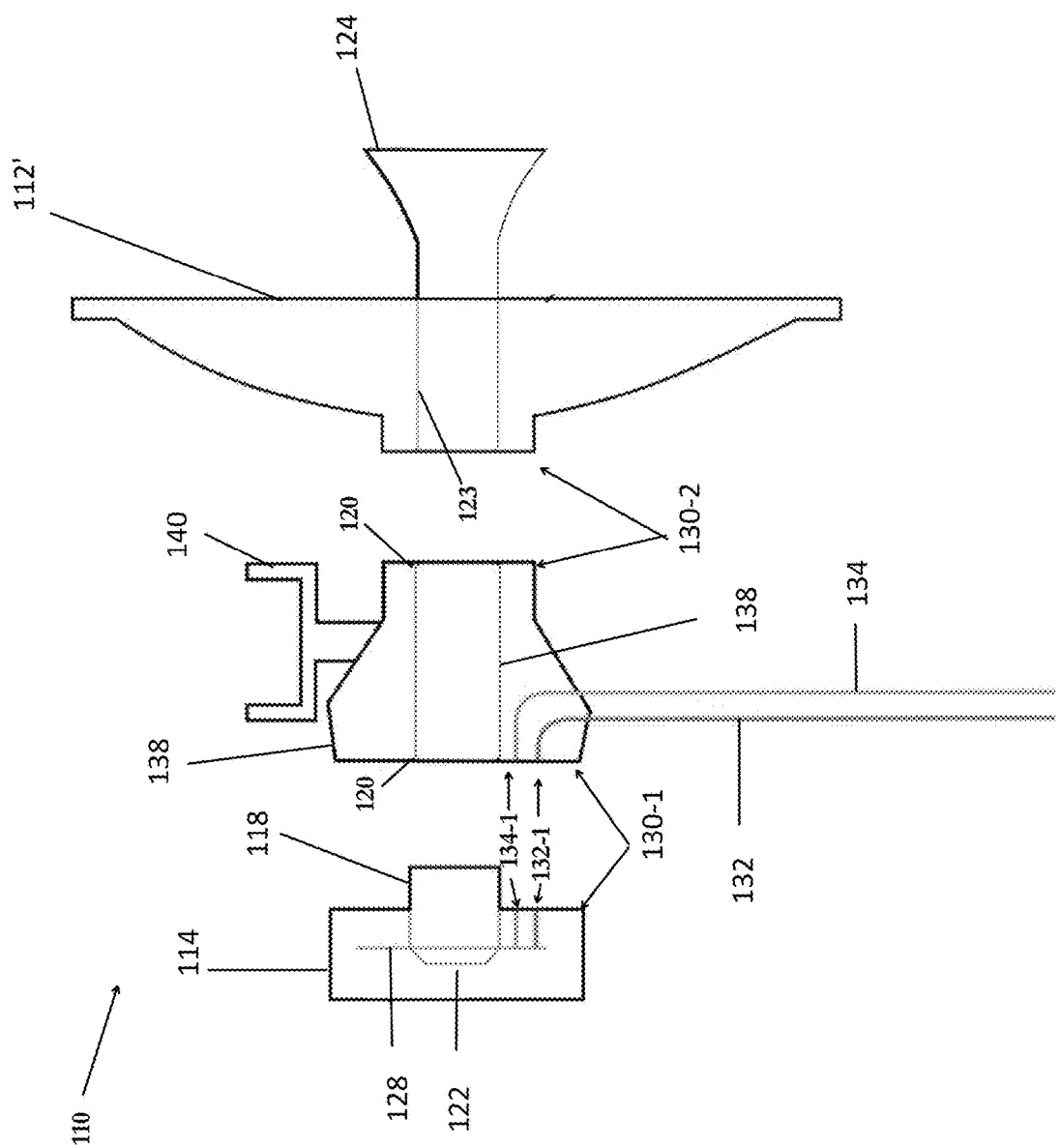
FIG. 3 schematic depiction of another alternate exemplary embodiment of the electromagnetic antenna of FIG. 2.

It should be recognized that antenna 112 is illustrated in FIG. 2 by way of example as a horn antenna. Of course, it is contemplated by the present disclosure antenna to have any desired shape such as, but not limited to, a parabolic shape, a dish shape, a planar shape, and others. By way of example, assembly 110 is shown in use in FIG. 3 with antenna 112' in the form of parabolic dish antenna.

Figure 11:
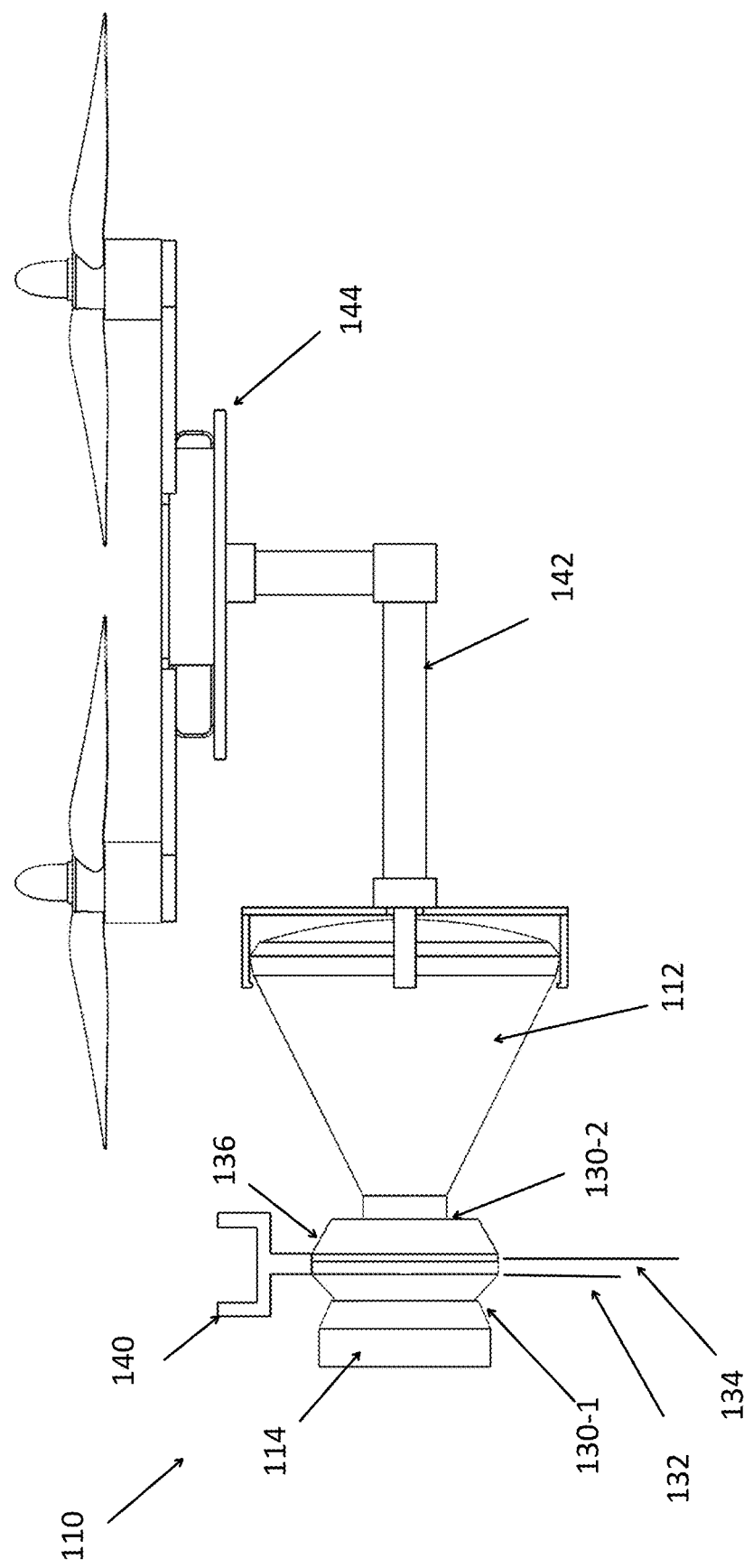
Figure 12:
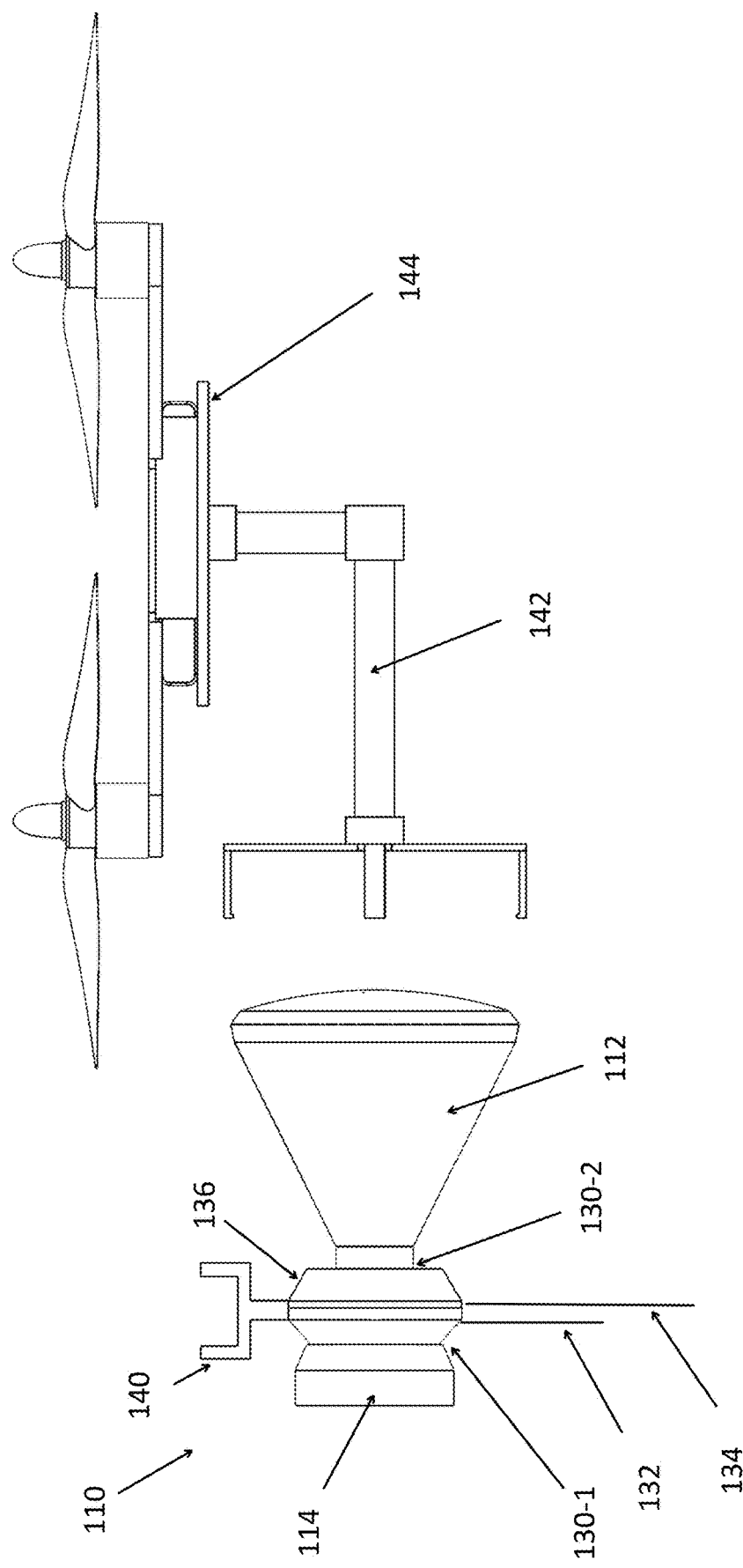
Figure 13:
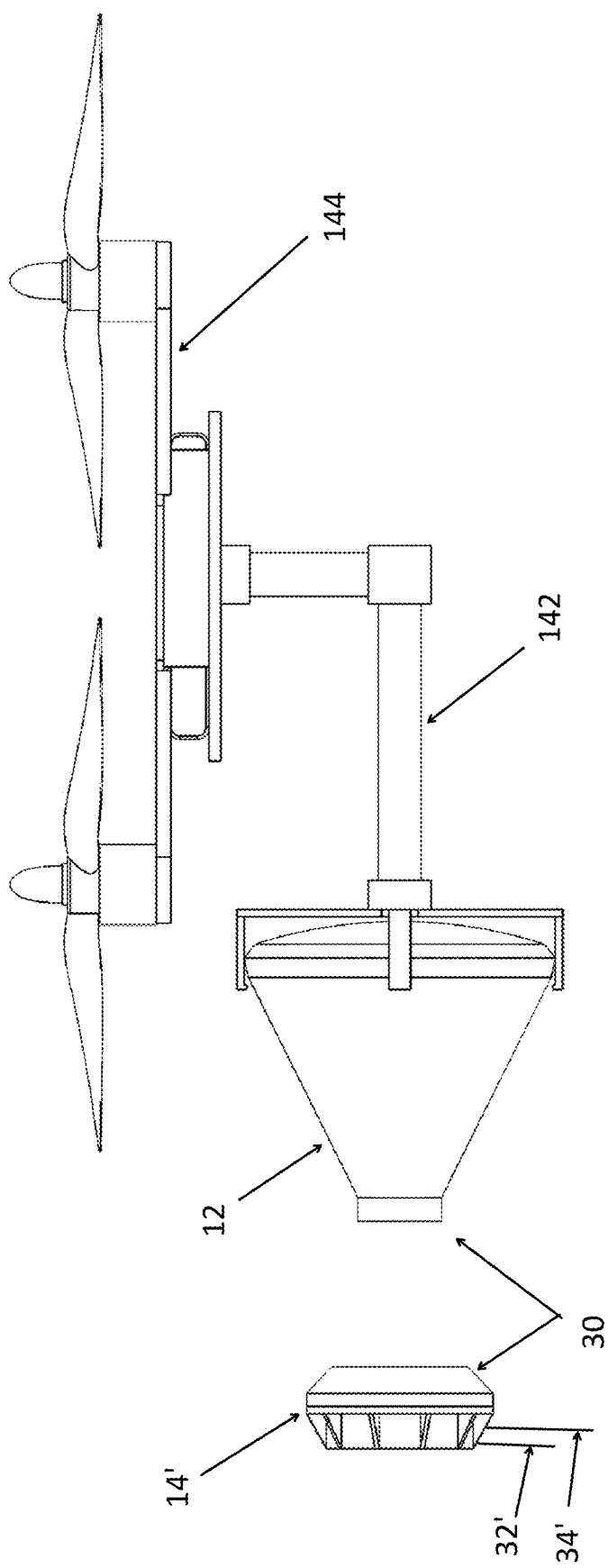
FIGS. 13-15 illustrate an exemplary embodiment of a method of assembling an antenna to a prior art radio.
Figure 14:
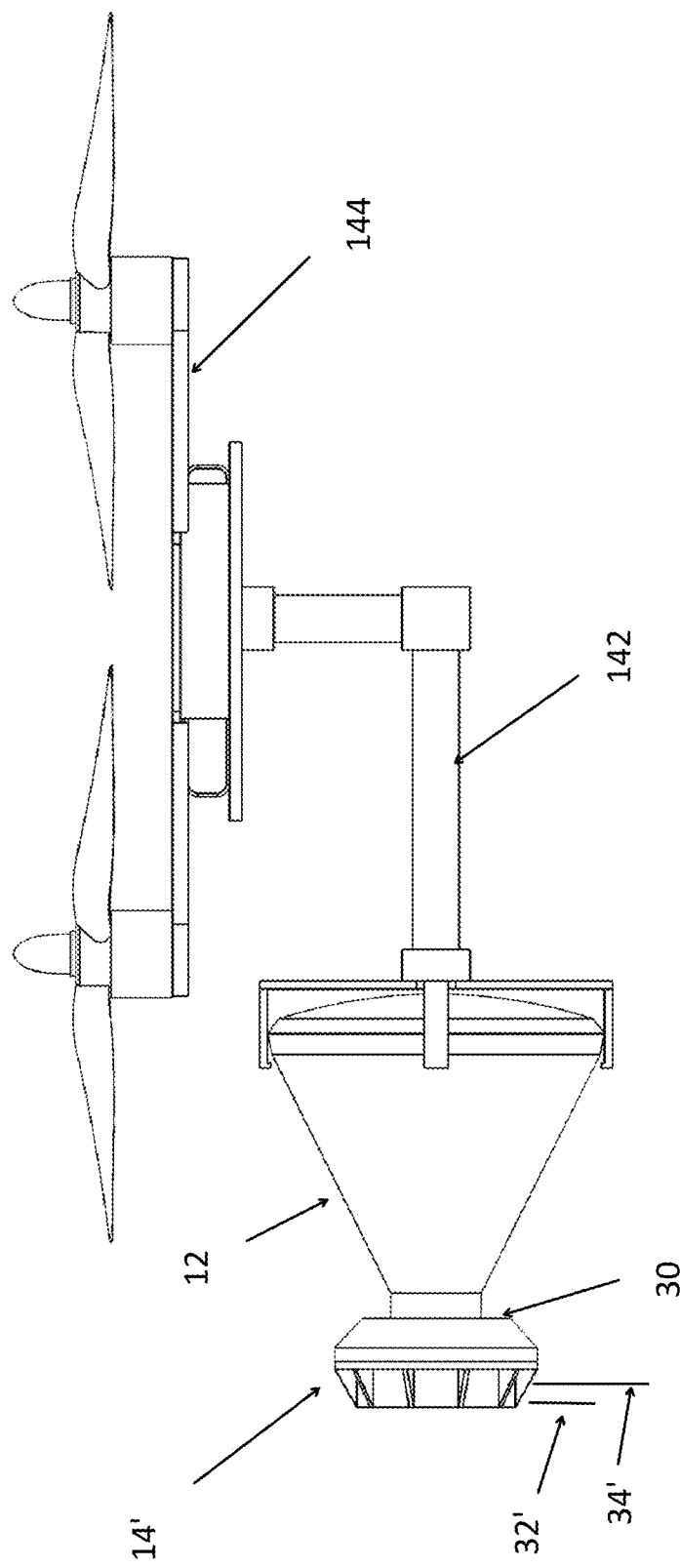
Figure 15:
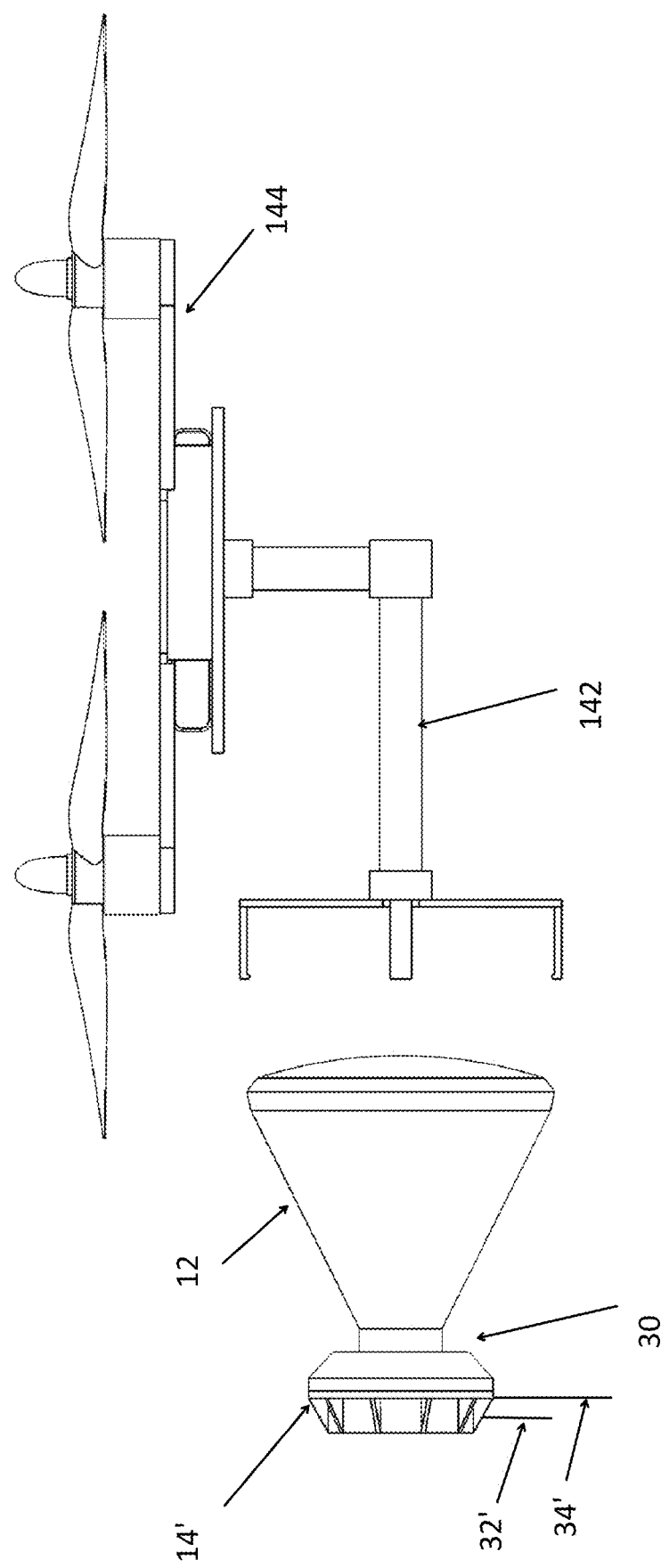

An exemplary embodiment of a method for assembling and/or disassembling the assembly 10, 110 of the present disclosure is shown in FIGS. 4-12 and for assembling and/or disassembling a radio to a prior art antenna in FIGS. 13-15.

The methods include the use of one or more robotic arms 142 being carried by a flying aerial drone 144. In this manner, the method of the present disclosure eliminates the need for an operator to be present on the structure carrying the assembly, which are often in hard to reach and/or high-risk locations.

Although arm 142 is shown by way of example in use with drone 144, it is of course contemplated by the present disclosure for the arm 142 to be operatively mounted on an extension pole or other device that allows the operator to remain remote from the assembly.

Figure 4:
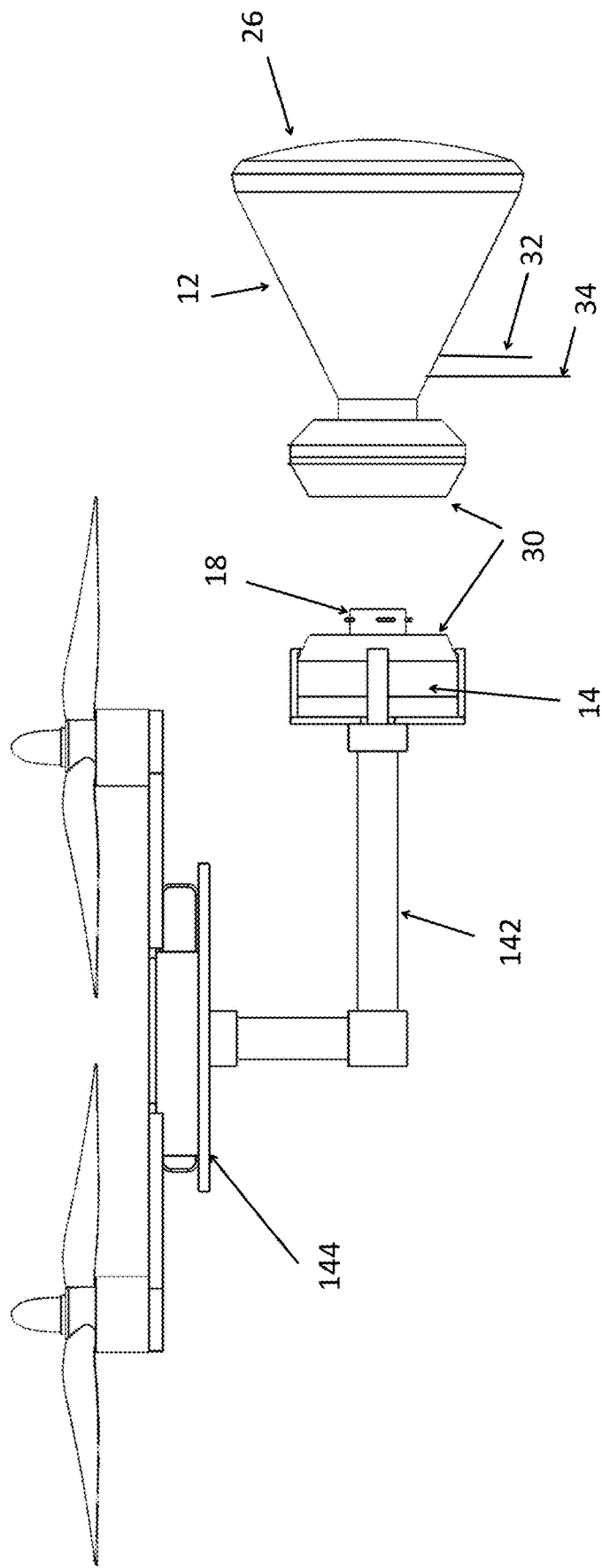
FIGS. 4-6 illustrate an exemplary embodiment of a method of assembling the assembly of FIG. 1.
Figure 5:
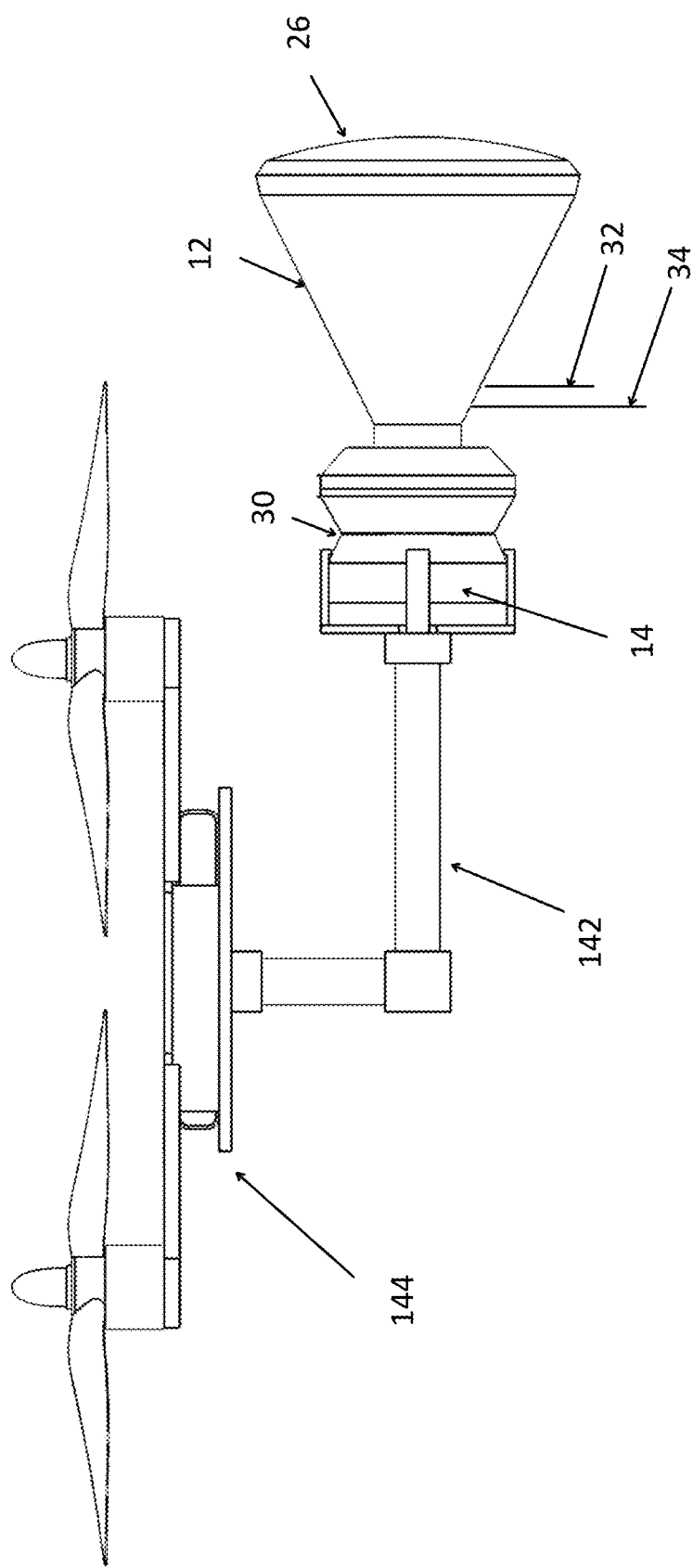
Figure 6:
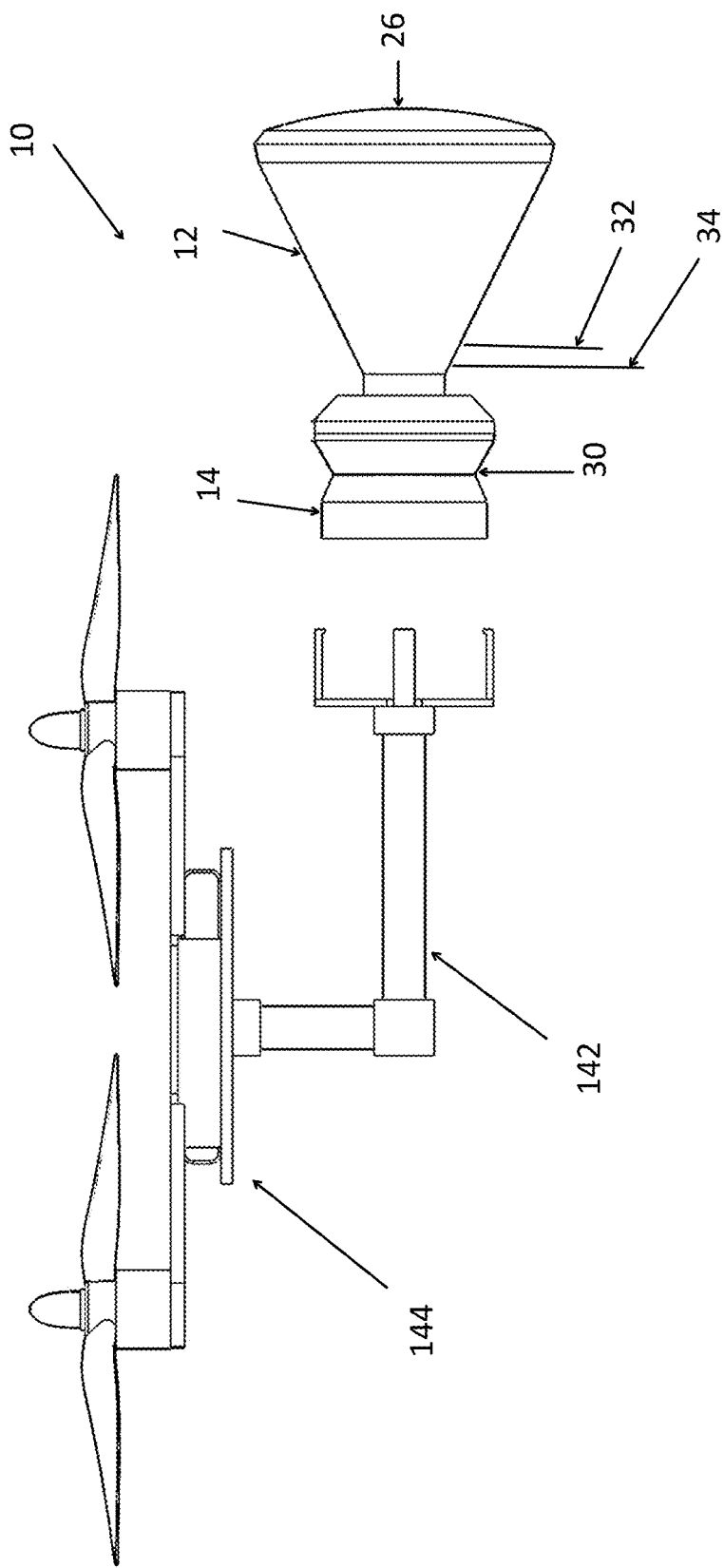

FIGS. 4-6 illustrate an exemplary embodiment of a method of assembling assembly 10 of FIG. 1.

Here, the method is shown assembling and/or disassembling radio 14 to antenna 12 using coupling 30. It has advantageously been determined by the present disclosure that the modular configuration—which requires only mechanical connection to simultaneously form the mechanical and electrical/data connection—allows for the assembling and/or disassembling of antenna 12 to/from radio 14 to be performed in an automated manner. As used herein, the phrase "automated manner" shall mean that the operator can assemble and/or disassemble of the antenna 12 to/from radio 14 remotely using, for example, a robotic arm 142 and, in some embodiments, aerial drone 144.

When present, drone 144 can be guided by the operator to carry arm 142 having radio 14 into position with respect to a pre-mounted and pre-wired (32, 34) antenna 12, to position the radio 14 onto the antenna 12 so as to form the desired mechanical and electromagnetic connection using coupling 30, and to release the radio 14 from the arm 142 once connected to the antenna 12.

During an assembly process, FIG. 4 illustrates the method of the present disclosure before assembly of radio 14 and antenna 12, FIG. 5 illustrates the method of the present disclosure during assembly of radio 14 and antenna 12, and FIG. 6 illustrates the method of the present disclosure after assembly of radio 14 and antenna 12.

Conversely, during a disassembly process the process illustrated in FIGS. 4-6 can be reversed.

Figure 7:
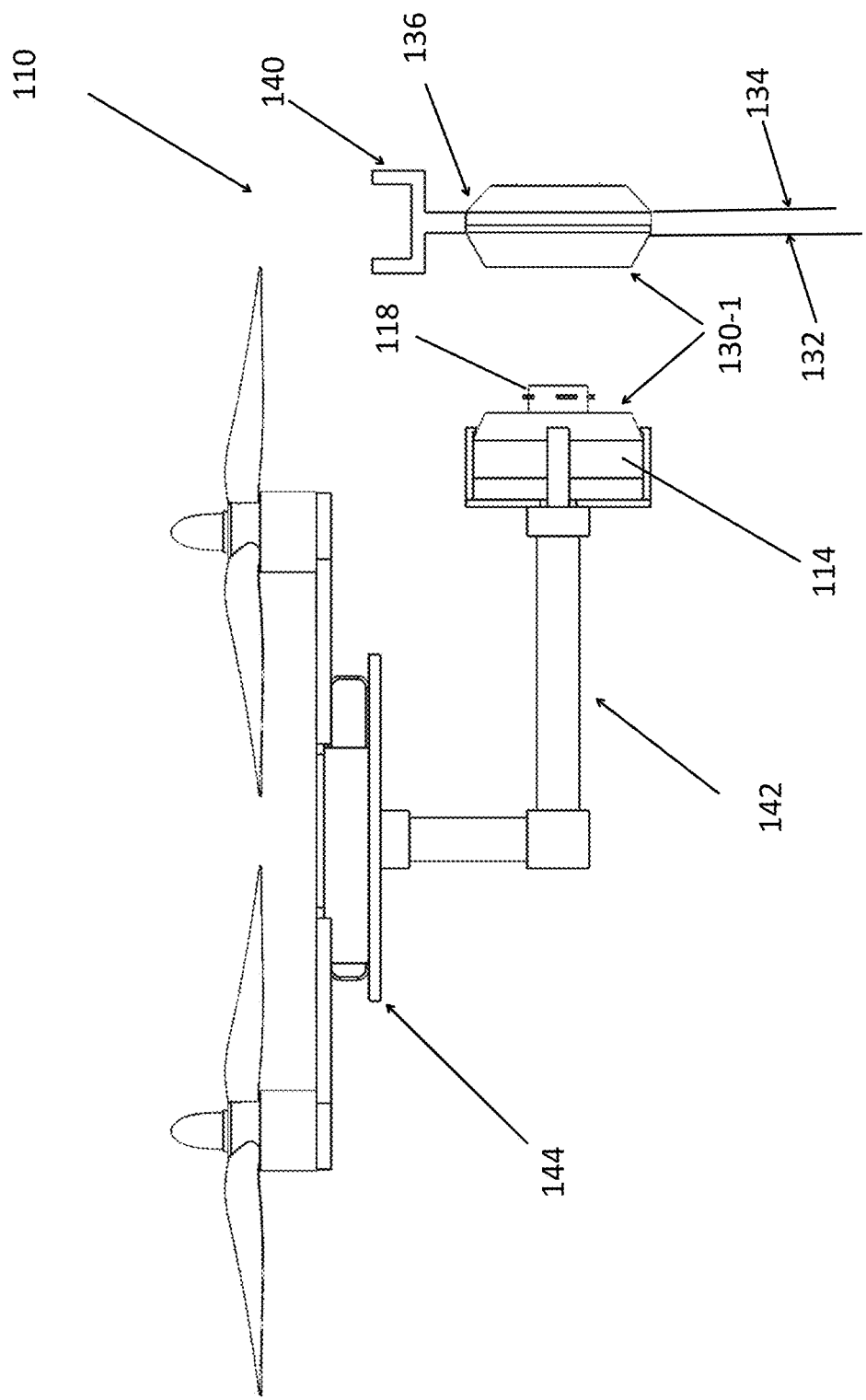
FIGS. 7-9 illustrate an exemplary embodiment of a method of assembling a radio to the assembly of FIG. 2.
Figure 8:
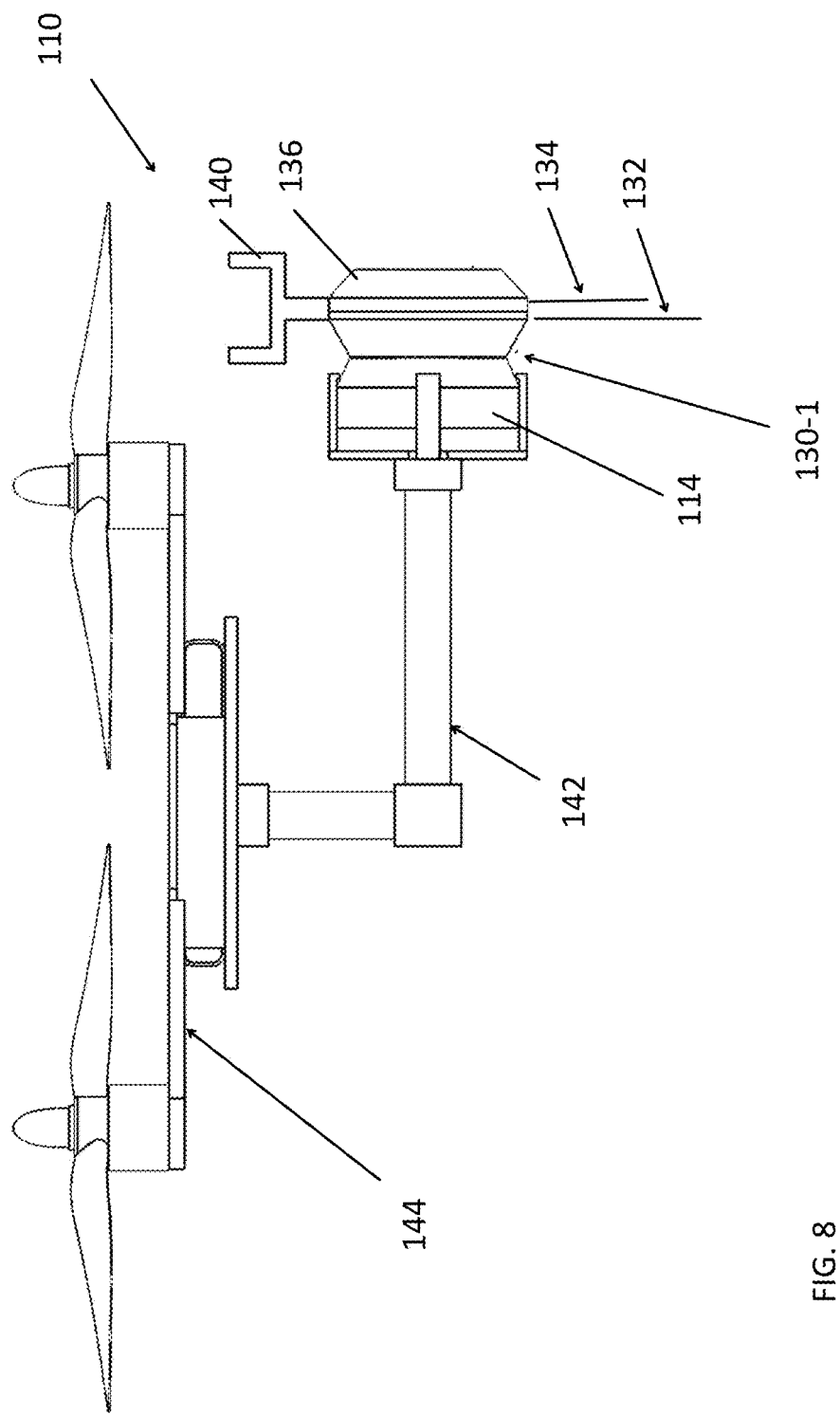
Figure 9:
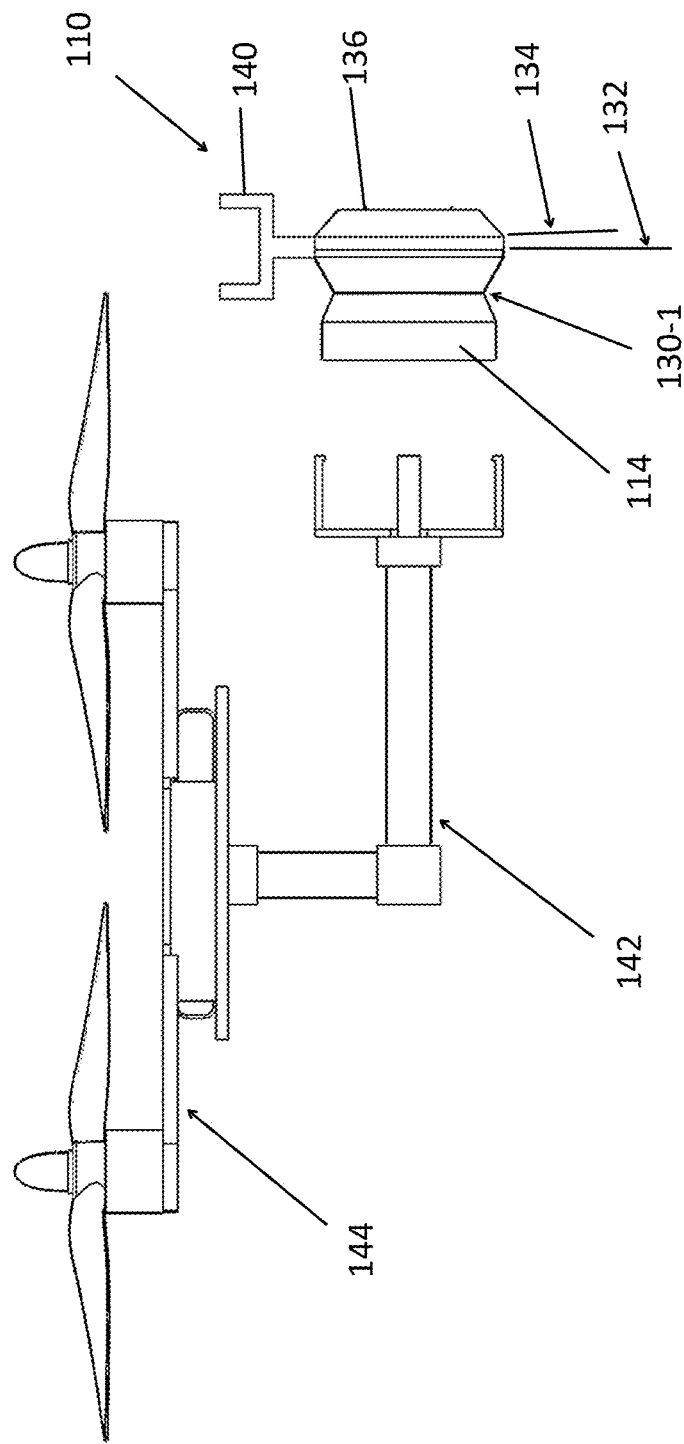

FIGS. 7-9 illustrate an exemplary embodiment of a method of assembling a radio to the assembly 110 of FIG. 2.

Here, the method is shown assembling and/or disassembling radio 114 and base 136 using coupling 130-1 in an automated manner. Thus, drone 144 can be guided by the operator to carry arm 142 having radio 114 into position with respect to a pre-mounted and pre-wired base 136, to position the radio 114 onto the base 136 so as to form the desired mechanical and electromagnetic connection using coupling 130-1, and to release the radio 114 once connected to the base 136.

During an assembly process, FIG. 7 illustrates the method of the present disclosure before assembly of radio 114 and base 136, FIG. 8 illustrates the method of the present disclosure during assembly of radio 114 and base 136, and FIG. 9 illustrates the method of the present disclosure after assembly of radio 114 and base 136. Conversely, during a disassembly process the process illustrated in FIGS. 7-9 can be reversed.

Figure 10:
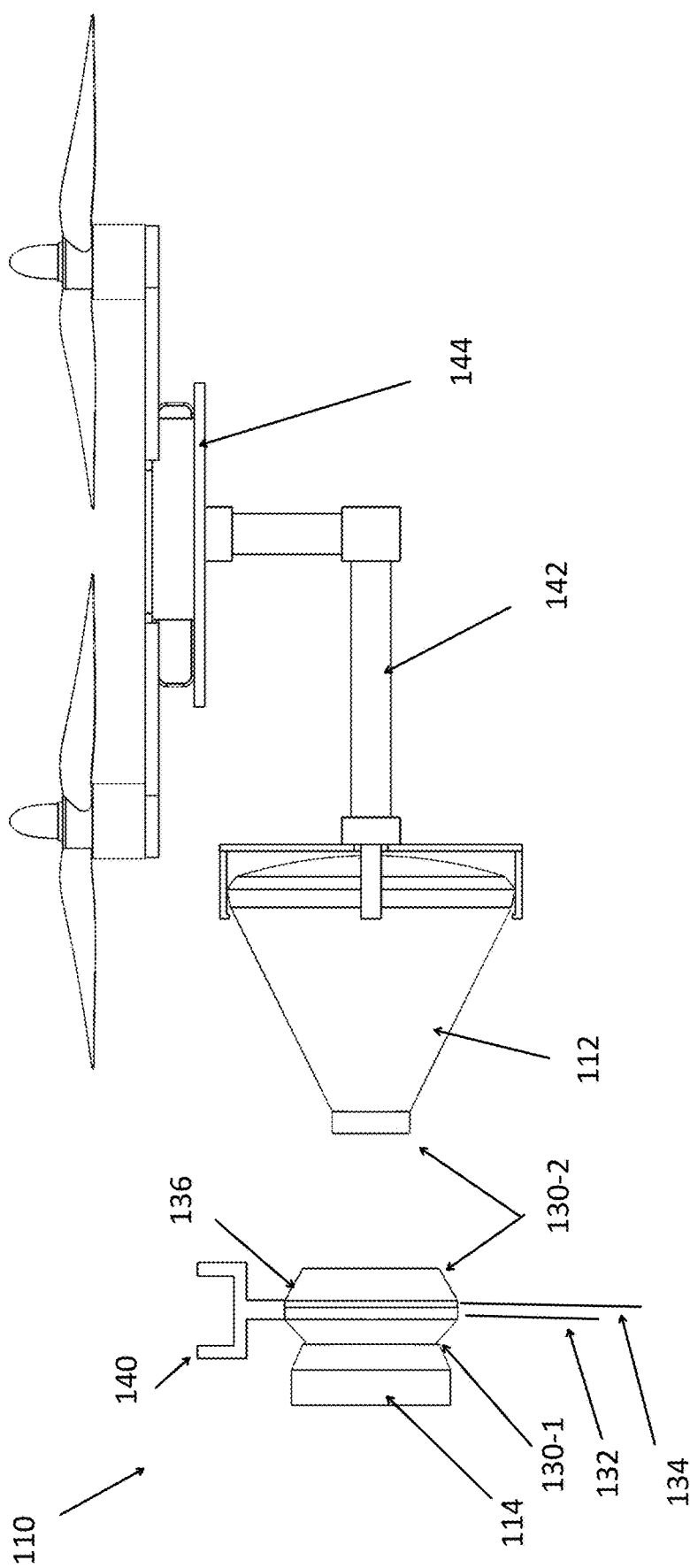
FIGS. 10-12 illustrate an exemplary embodiment of a method of assembling an antenna to the assembly of FIG. 2.

FIGS. 10-12 illustrate an exemplary embodiment of a method of assembling an antenna to the assembly 110 of FIG. 2.

Here, the method is shown assembling and/or disassembling antenna 112 and base 136 using coupling 130-2 in an automated manner. Thus, drone 144 can be guided by the operator to carry arm 142 having antenna 112 into position with respect to a pre-mounted and pre-wired base 136, to position the antenna 112 onto the base 136 so as to form the desired mechanical and electromagnetic connection using coupling 130-2, and to release the antenna 112 once connected to the base 136.

In this embodiment, radio 114 is shown already connected to base 136. However, it is contemplated by the present disclosure for radio 114 and antenna 112 to be connected to base in any desired order.

During an assembly process, FIG. 10 illustrates the method of the present disclosure before assembly of antenna 112 and base 136, FIG. 11 illustrates the method of the present disclosure during assembly of antenna 112 and base 136, and FIG. 12 illustrates the method of the present disclosure after assembly of antenna 112 and base 136. Conversely, during a disassembly process the process illustrated in FIGS. 10-12 can be reversed.

FIGS. 13-15 illustrate an exemplary embodiment of a method of assembling an antenna to a prior art radio 14'. Here, the prior art radio 14' is shown having been pre-mounted and pre-wired with cables 32', 34' and including the necessary portions of coupling 30 to allow for automated installation. Thus, the method is shown assembling and/or disassembling antenna 12 to/from radio 14' using coupling 30 in an automated manner.

Drone 144 can be guided by the operator to carry arm 142 having antenna 12 into position with respect to a pre-mounted and pre-wired radio 14', to position the antenna 12 onto the radio 14' so as to form the desired mechanical and electromagnetic connection using coupling 30, and to release the antenna 12 once connected to the radio 14'.

During an assembly process, FIG. 13 illustrates the method of the present disclosure before assembly of antenna 12 and radio 14', FIG. 14 illustrates the method of the present disclosure during assembly of antenna 12 and radio 14', and FIG. 15 illustrates the method of the present disclosure after assembly of antenna 12 and radio 14'. Conversely, during a disassembly process the process illustrated in FIGS. 13-15 can be reversed.

Figure 16:
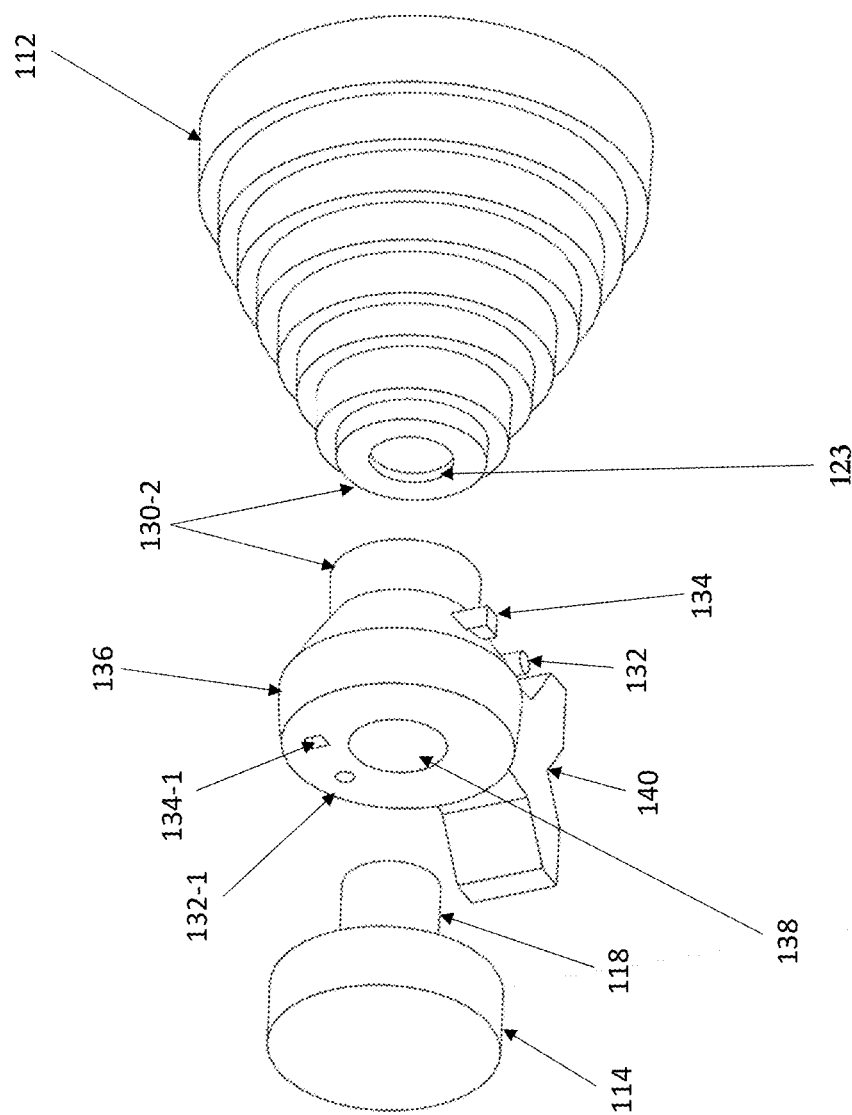
FIGS. 16-17 illustrate an alternate exemplary embodiment of an electromagnetic antenna assembly according to the present disclosure.
Figure 17:
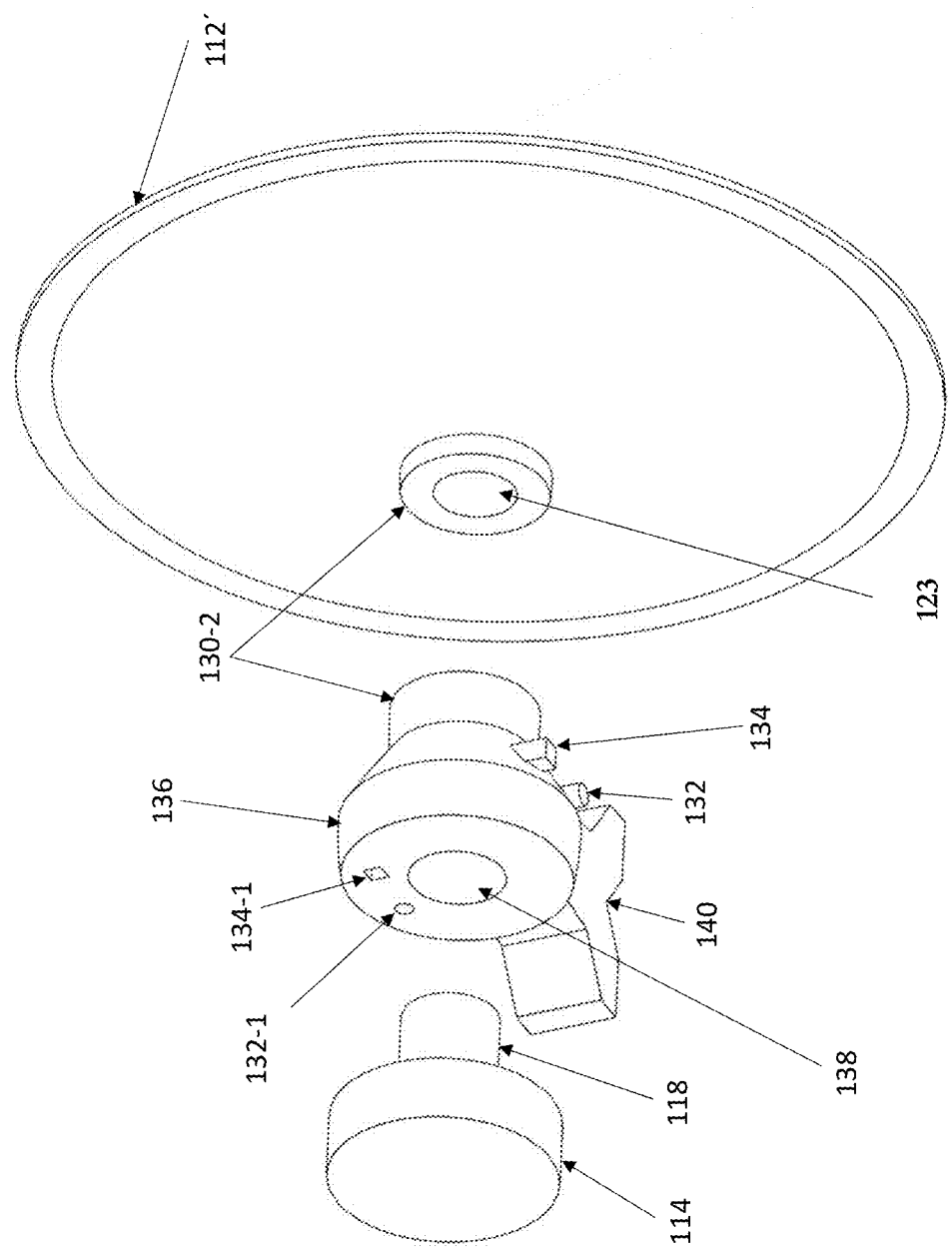

Turning now to FIGS. 16-17, an exemplary embodiment of power feed connectors 132-1 and data feed connectors 134-1 are shown. Here, connectors 132-1, 134-1 are separated on both in and out of base 136. Assembly 110 is shown both with horn antenna 112 in FIG. 16 and with parabolic dish antenna 112' in FIG. 17.

Figure 18:
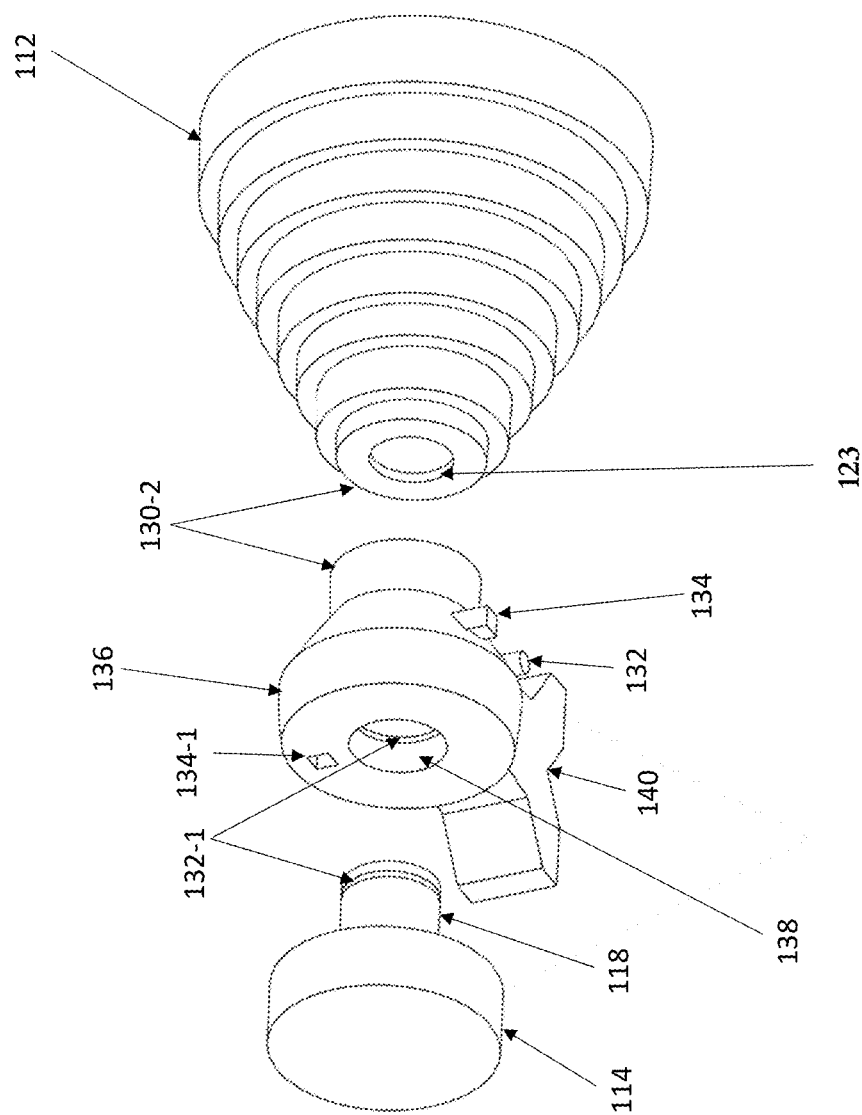
FIGS. 18-19 illustrate another alternate exemplary embodiment of an electromagnetic antenna assembly according to the present disclosure.
Figure 19:
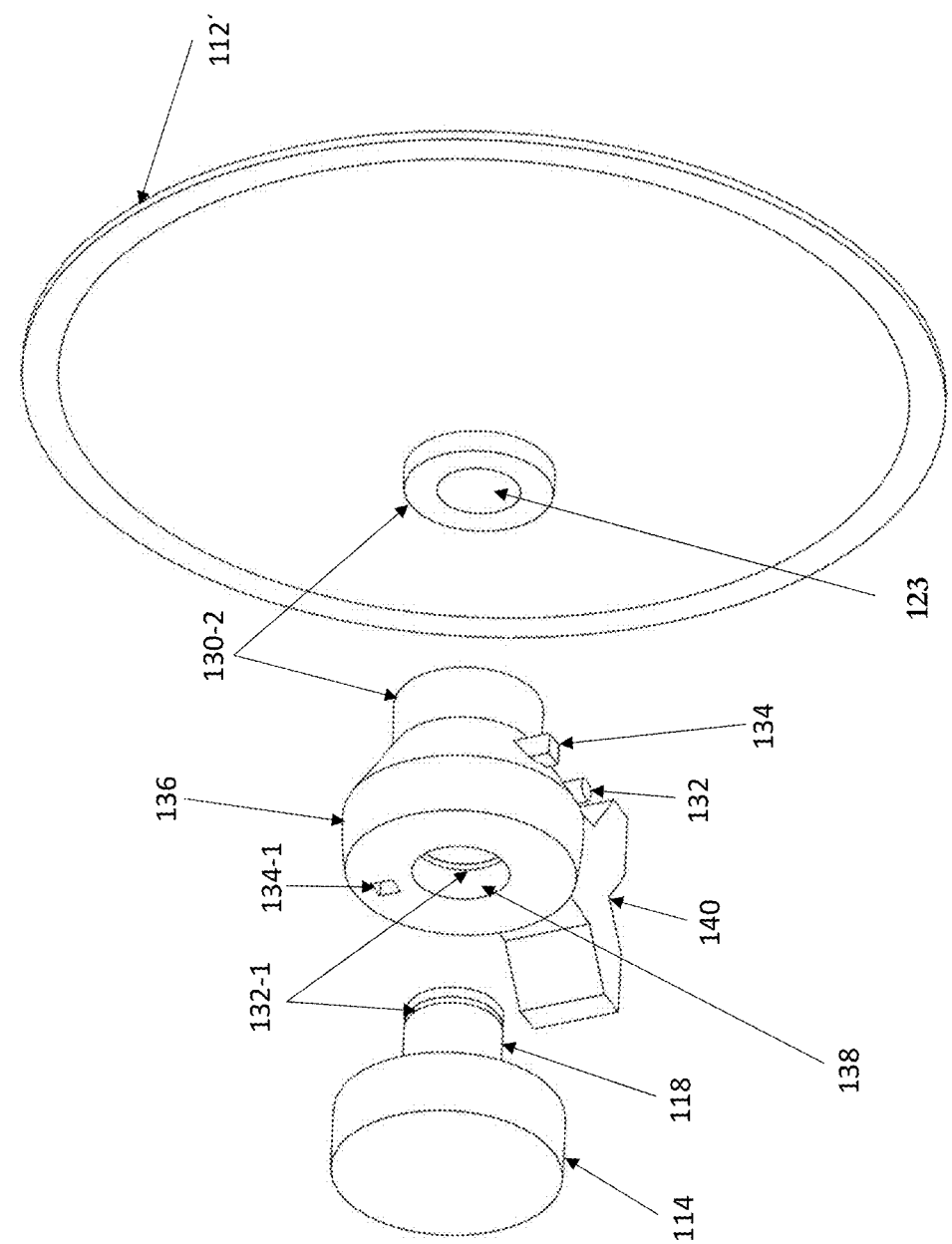

Turning now to FIGS. 18-19, another exemplary embodiment of power feed connectors 132-1 and data feed connectors 134-1 are shown. Here, connectors 132-1, 134-1 are separated on both in and out of base 136, with the power feed connectors 132-1 being integrated in waveguide portion 118 and central portion 138. Assembly 110 is shown both with horn antenna 112 in FIG. 18 and with parabolic dish antenna 112' in FIG. 19.

Figure 20:
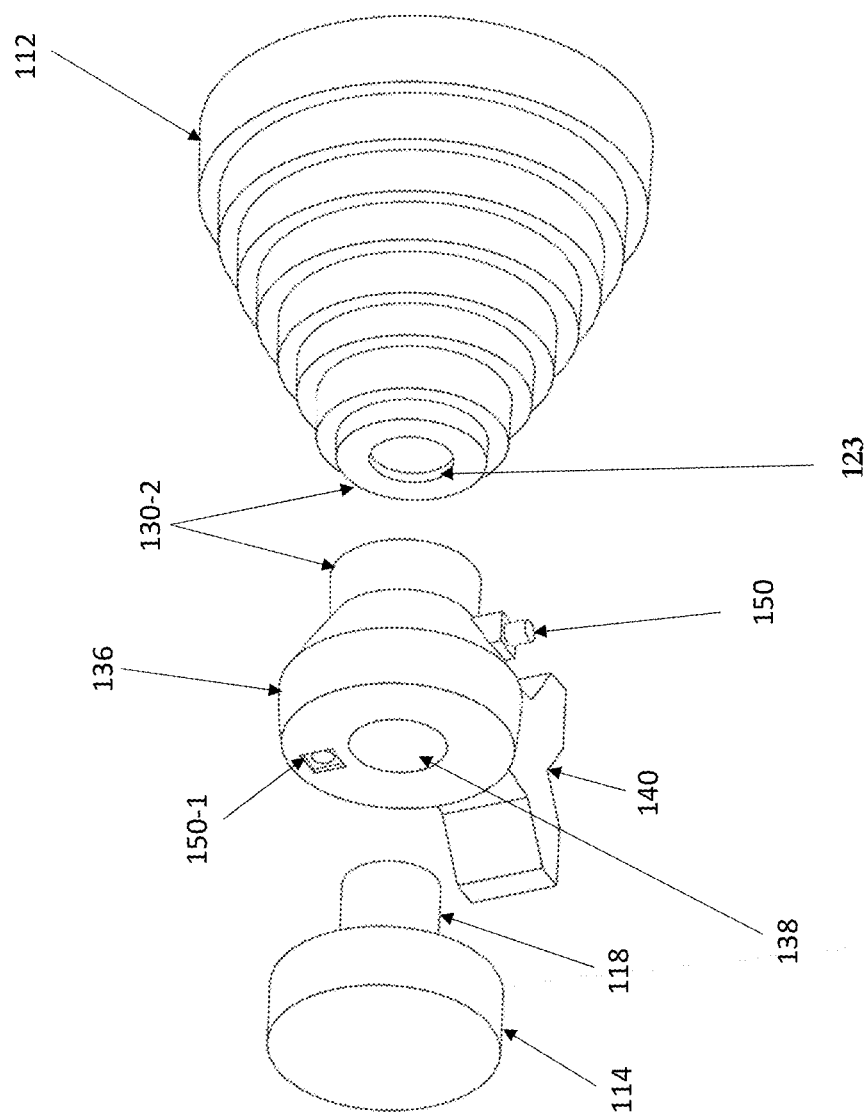
FIGS. 20-21 illustrate yet another alternate exemplary embodiment of an electromagnetic antenna assembly according to the present disclosure.
Figure 21:
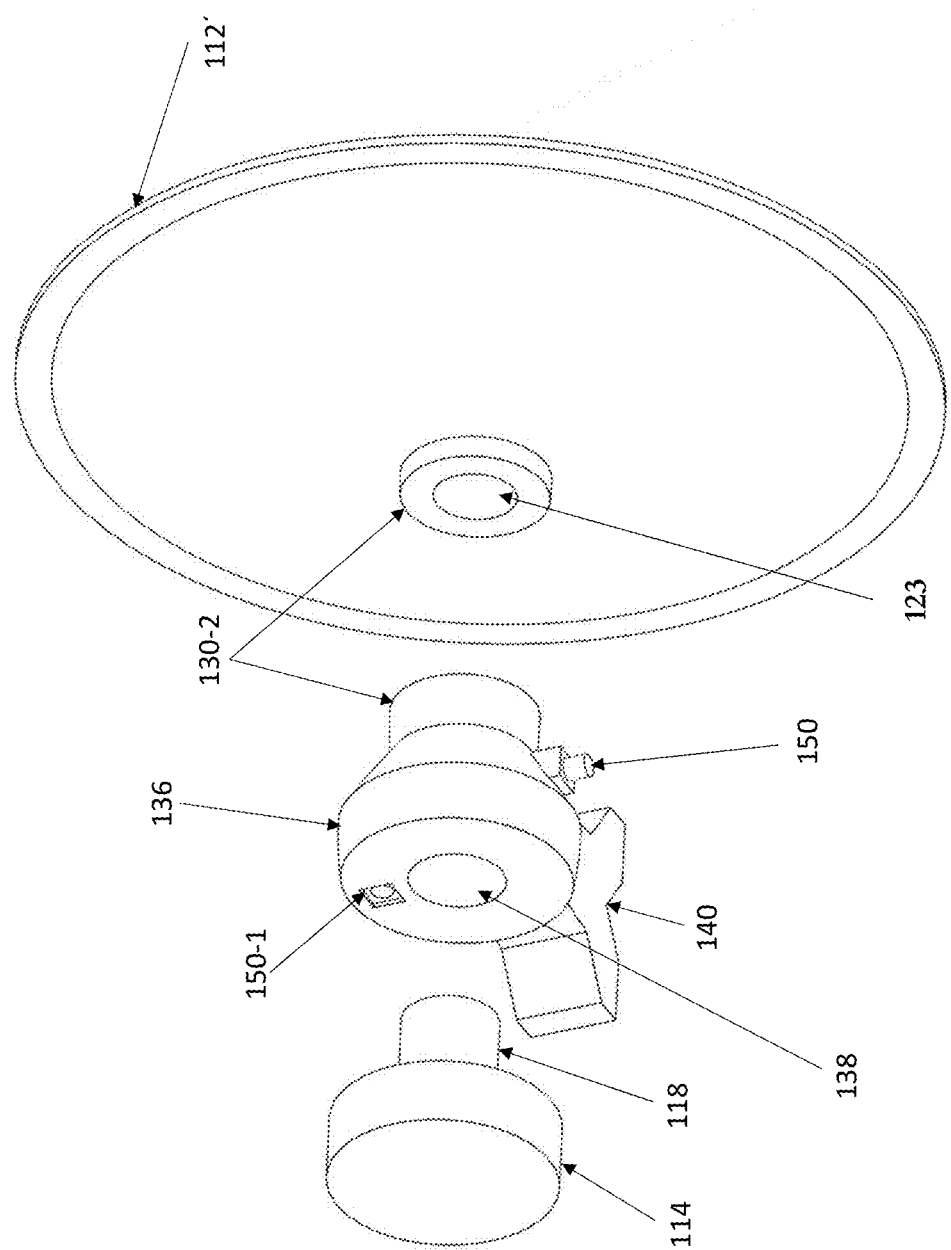

Turning now to FIGS. 20-21, another exemplary embodiment of the power and data feed connectors are shown. In this embodiment, the power and data feeds are combined in a single feed 150 and connectors 150-1 are similarly combined into a single connector on base 136. Assembly 110 is shown both with horn antenna 112 in FIG. 20 and with parabolic dish antenna 112' in FIG. 21.

Figure 22:
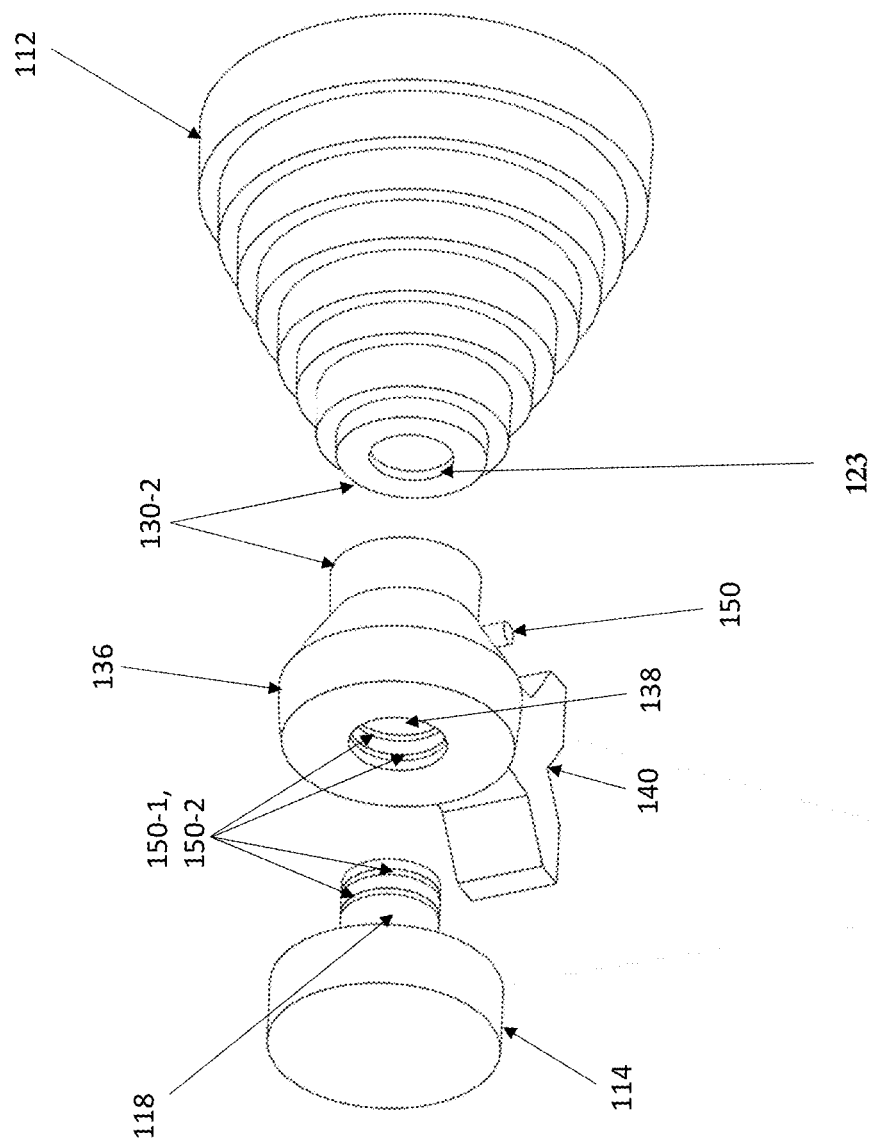
FIGS. 22-23 illustrate still another alternate exemplary embodiment of an electromagnetic antenna assembly according to the present disclosure.
Figure 23:
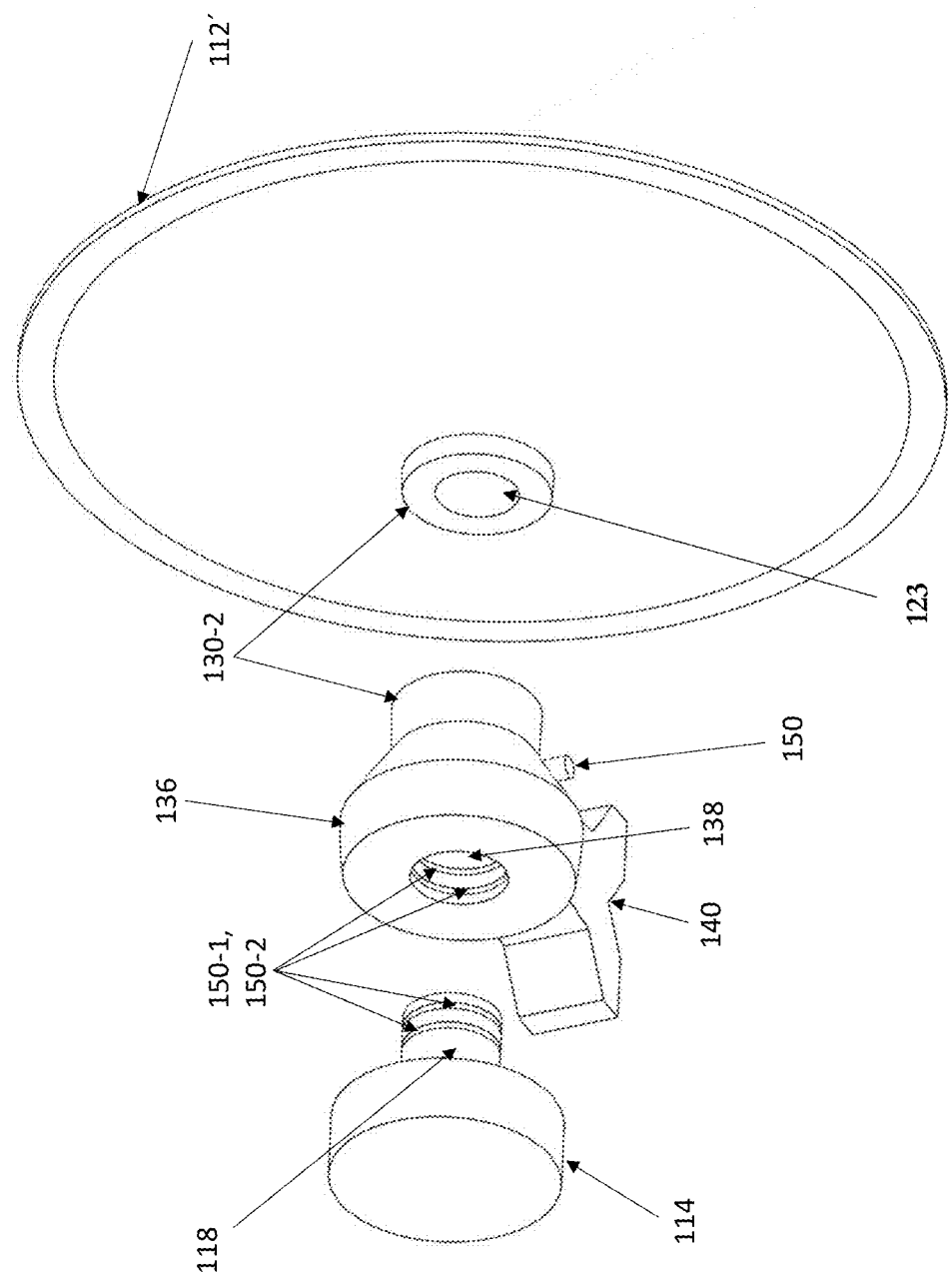

Turning now to FIGS. 22-23, yet another exemplary embodiment of the power and data feed connectors are shown. In this embodiment, the power and data feeds are combined in a single feed 150, but connectors 150-1, 150-2 are separated. Connectors 150-1, 150-2 are both integrated in waveguide portion 118 and central portion 138, respectively. Assembly 110 is shown both with horn antenna 112 in FIG. 22 and with parabolic dish antenna 112' in FIG. 23.

Turning now to FIGS. 24-35, alternate embodiments of methods of assembling antenna and radios are shown.

Figure 24:
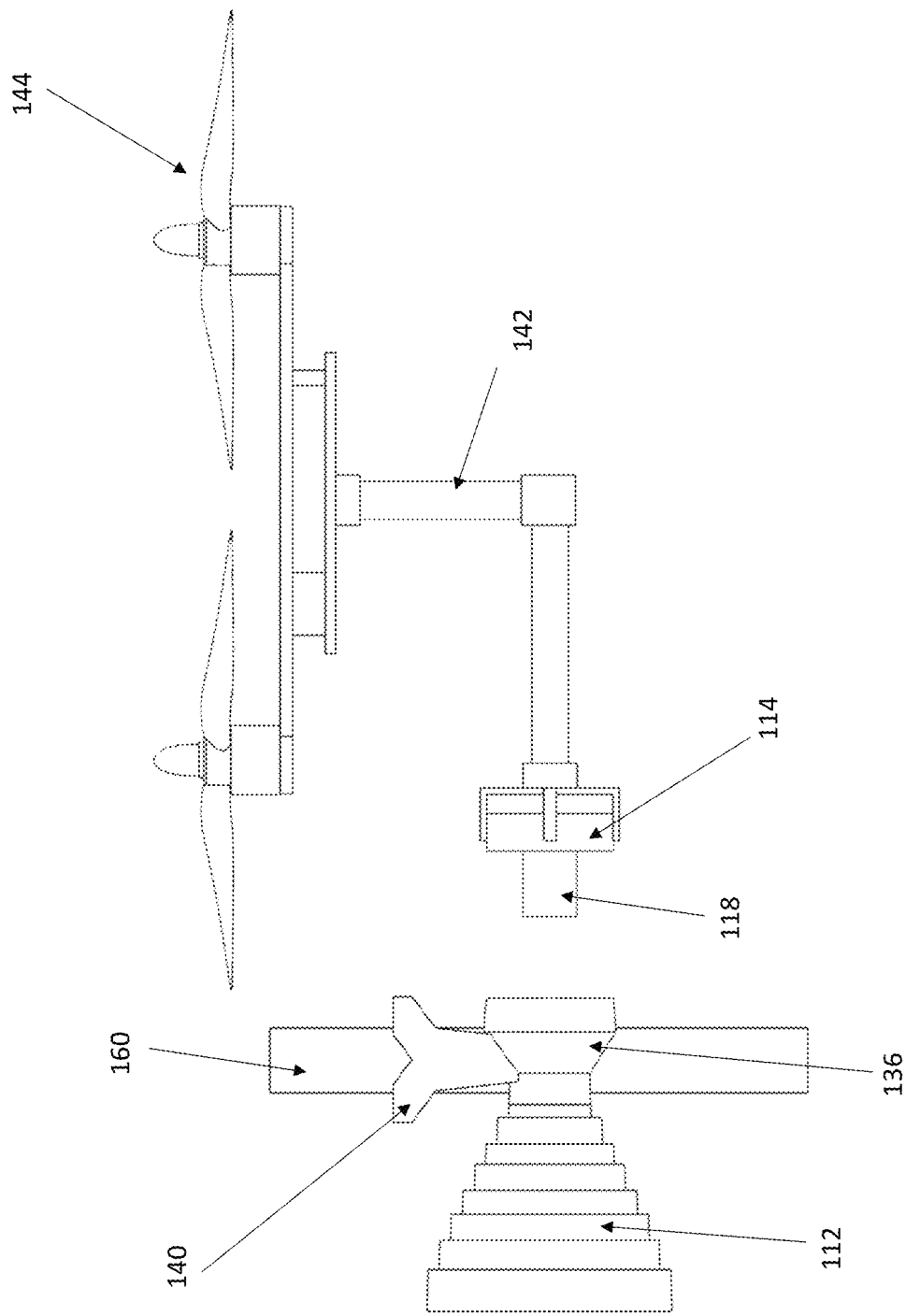
FIGS. 24-25 illustrate exemplary embodiments of methods of assembling a radio and/or a horn antenna to the assembly of FIG. 16, 18, 20, or 22.
Figure 25:
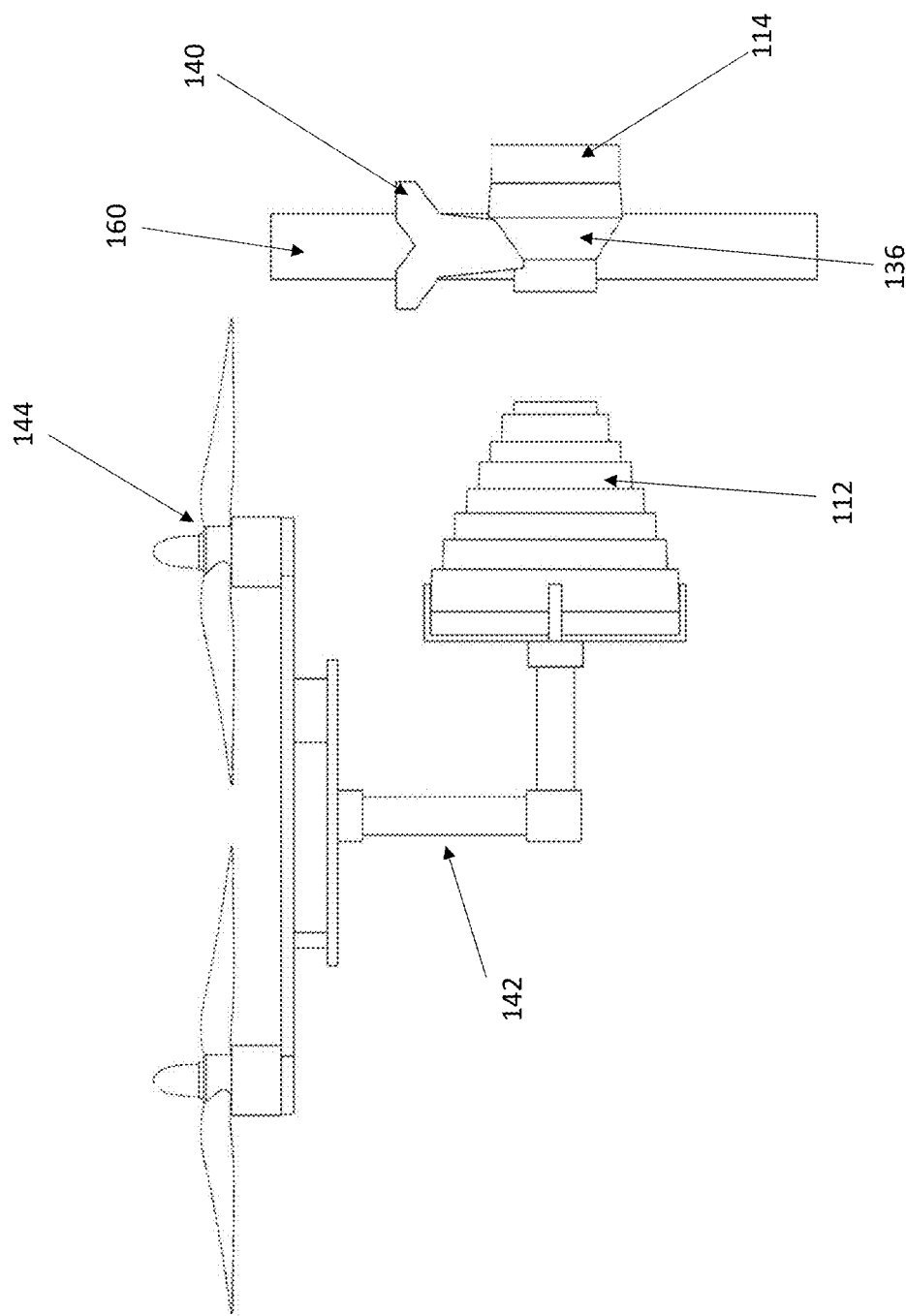

In FIGS. 24 and 25, radio 114 and horn antenna 112 are shown being installed or removed with flying aerial drone 144 equipped with single robotic arm 142. Here, bracket 140 is secured to a structure 160 and drone 144 is operated to install/remove the radio 114 and/or antenna 112 during the flight of the drone.

Figure 26:
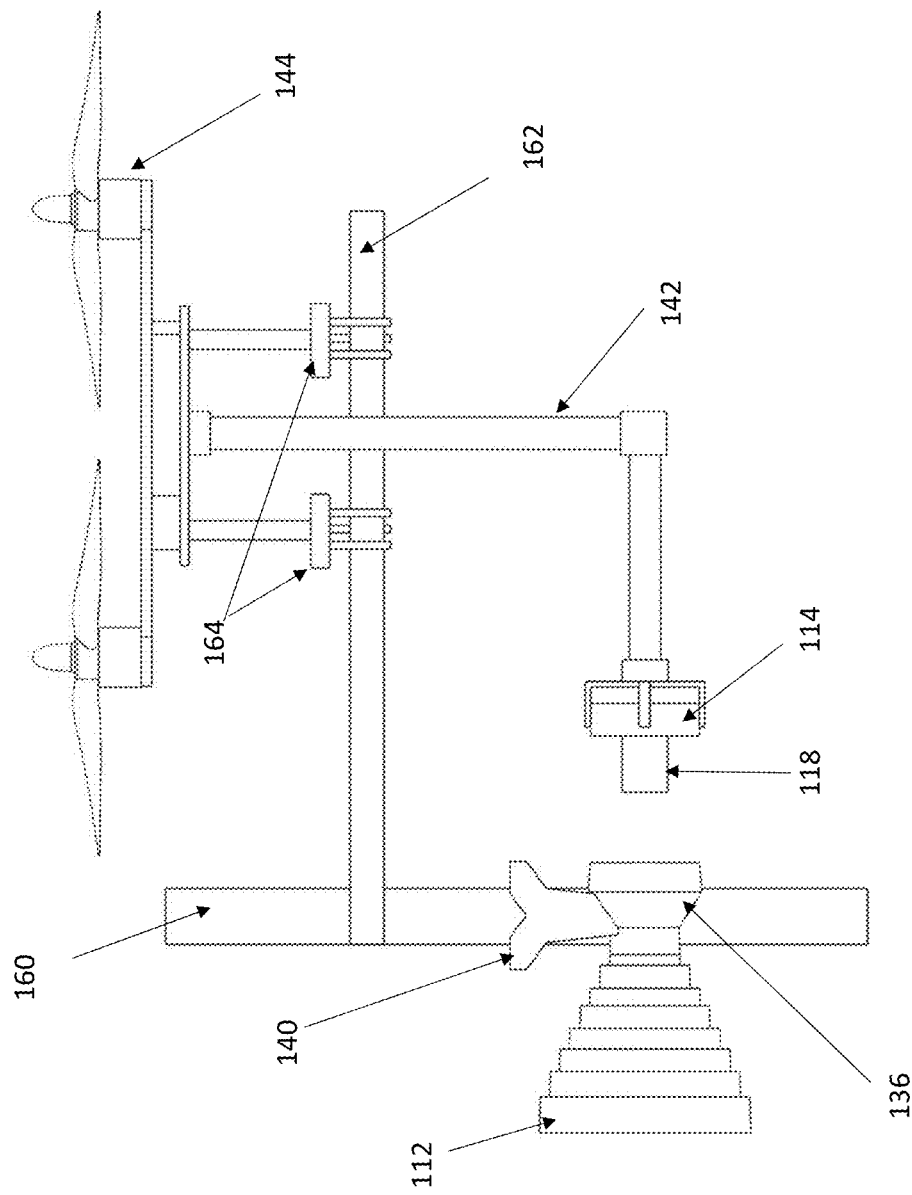
FIGS. 26-27 illustrate other exemplary embodiments of methods of assembling a radio and/or a horn antenna to the assembly of FIG. 16, 18, 20, or 22.
Figure 27:
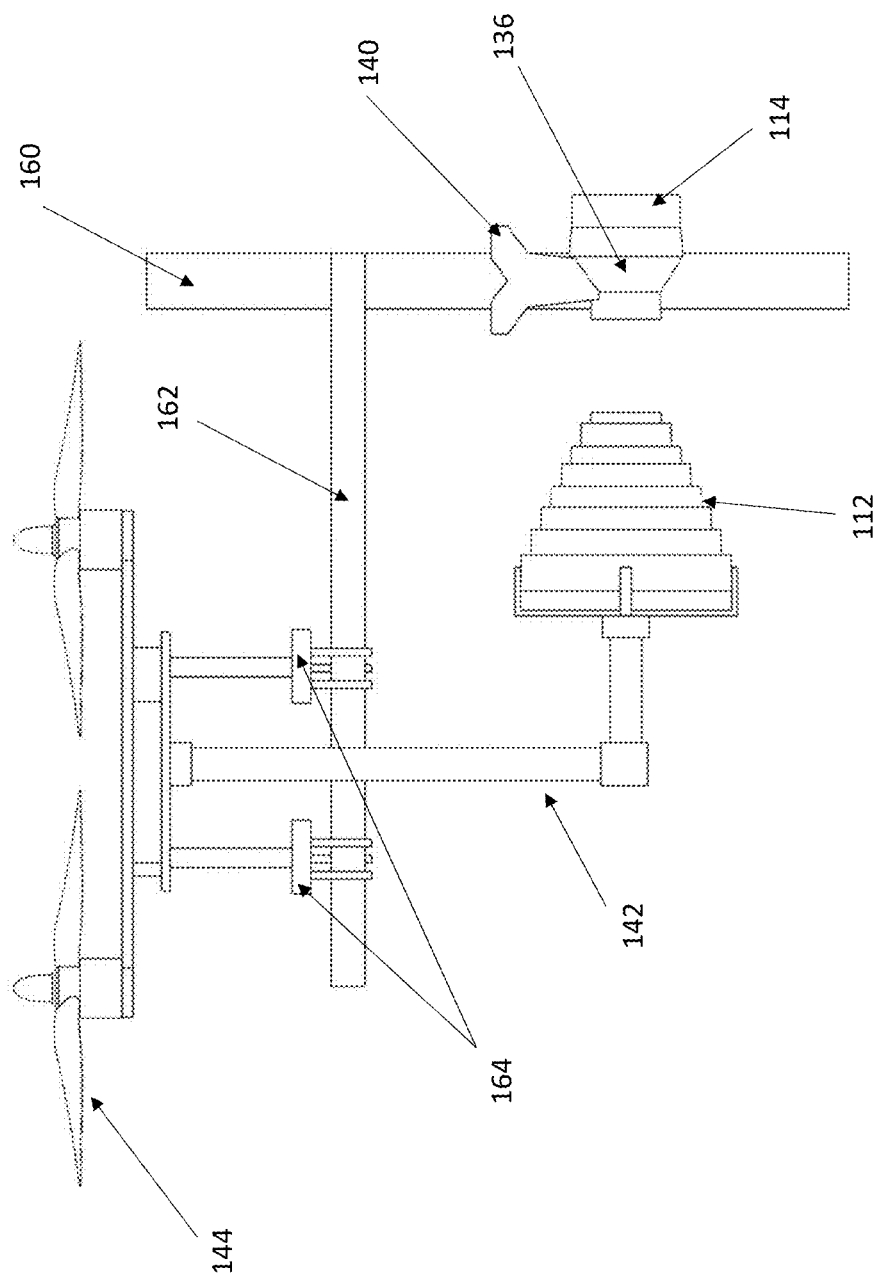

In FIGS. 26 and 27, bracket 140 is secured to a structure 160 that includes a perch 162. Here, flying aerial drone 144 includes one or more feet 164 that grasp or otherwise rest on perch 162. In this manner, drone 144 can rest via feet 164 on perch 162 during one or more portions of the installation/removal of radio 114 and/or antenna 112.

Figure 28:
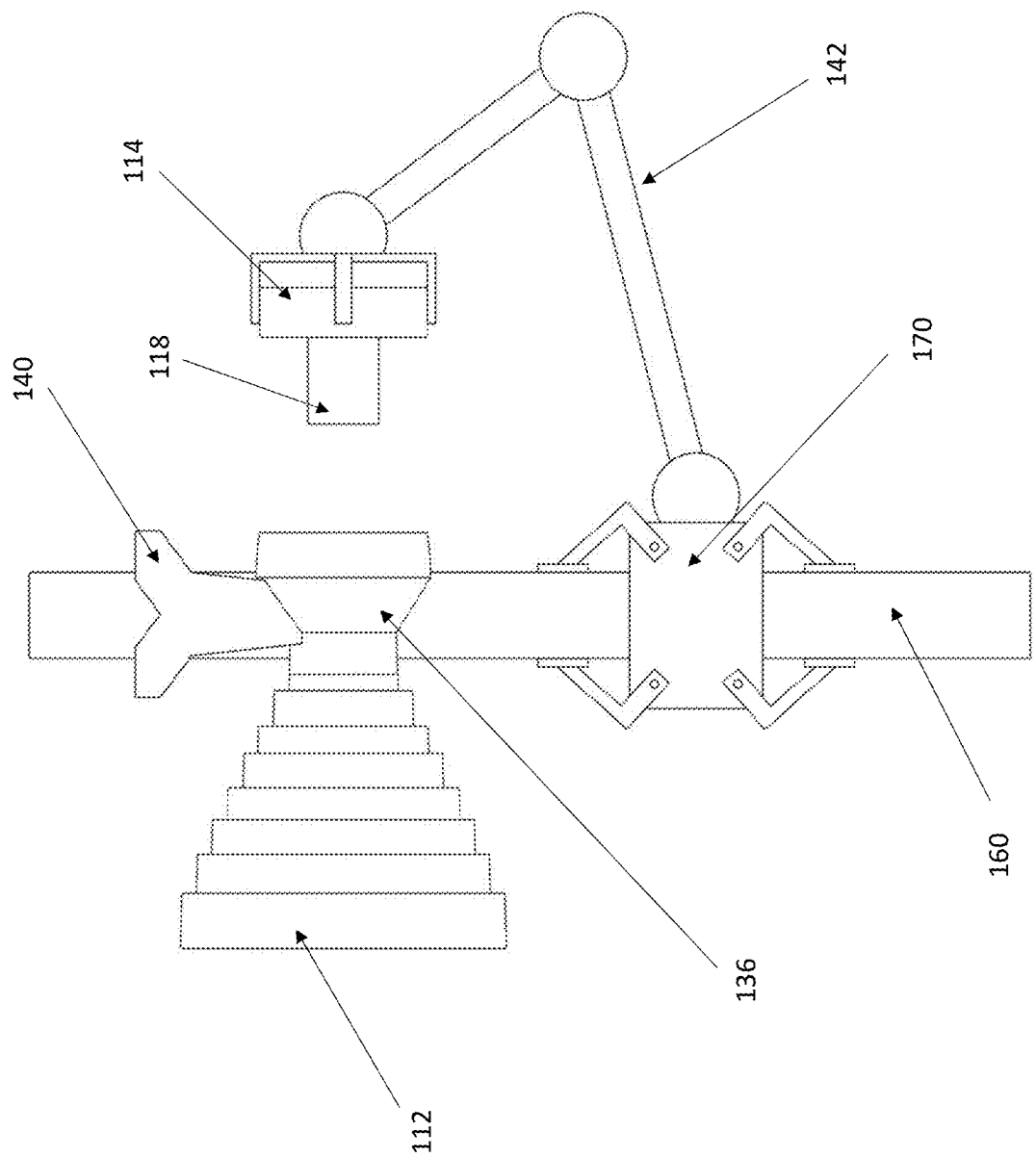
FIGS. 28-29 illustrate still other exemplary embodiments of methods of assembling a radio and/or a horn antenna to the assembly of FIG. 16, 18, 20, or 22.
Figure 29:
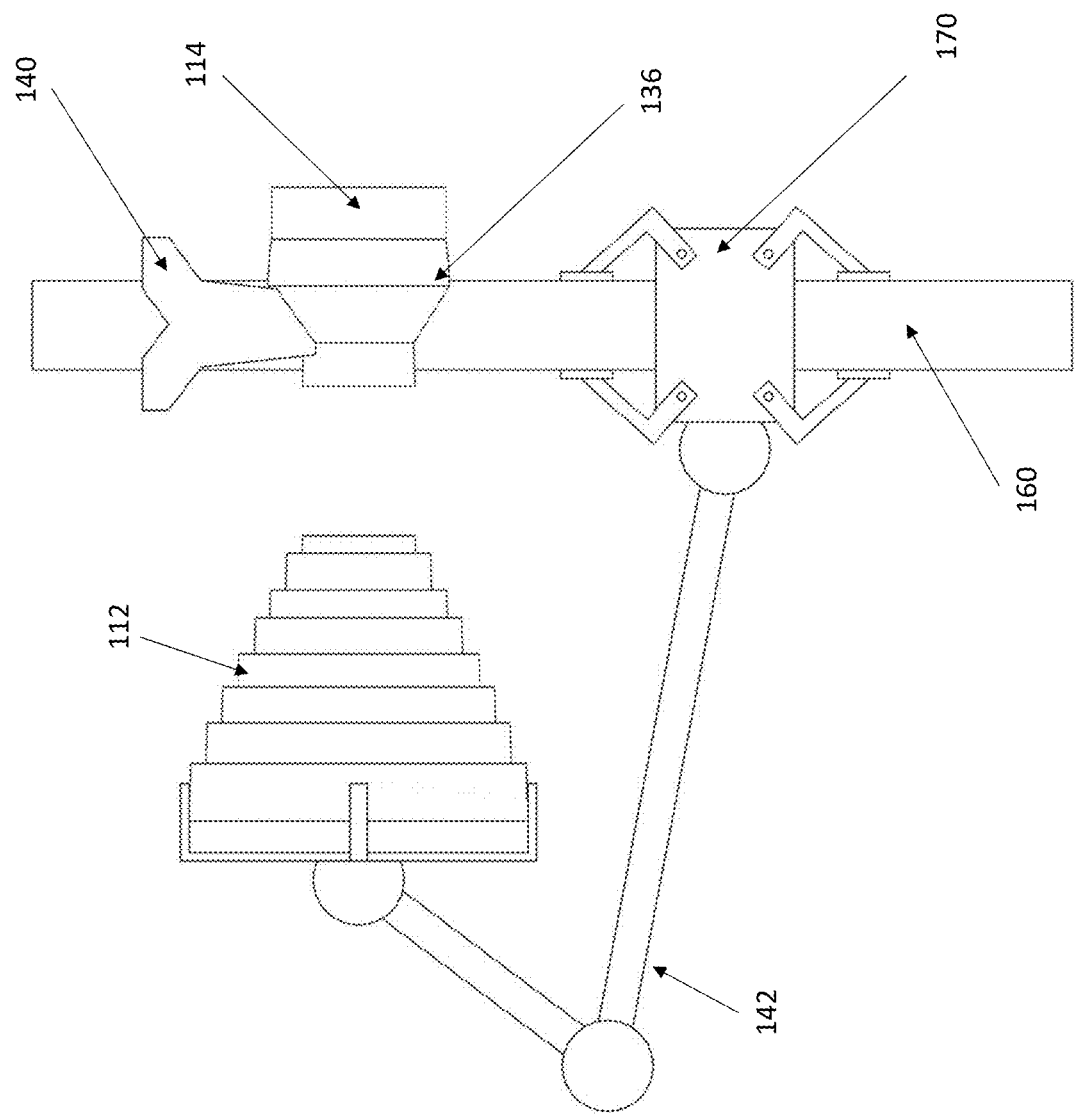

In FIGS. 28 and 29, radio 114 and horn antenna 112 are shown being installed or removed with climbing robotic drone 170 equipped with one or more robotic arms 142. Here, bracket 140 is secured to a structure 160 and drone 170 is operated to the climb structure and once in position to install/remove the radio 114 and/or antenna 112.

Figure 30:
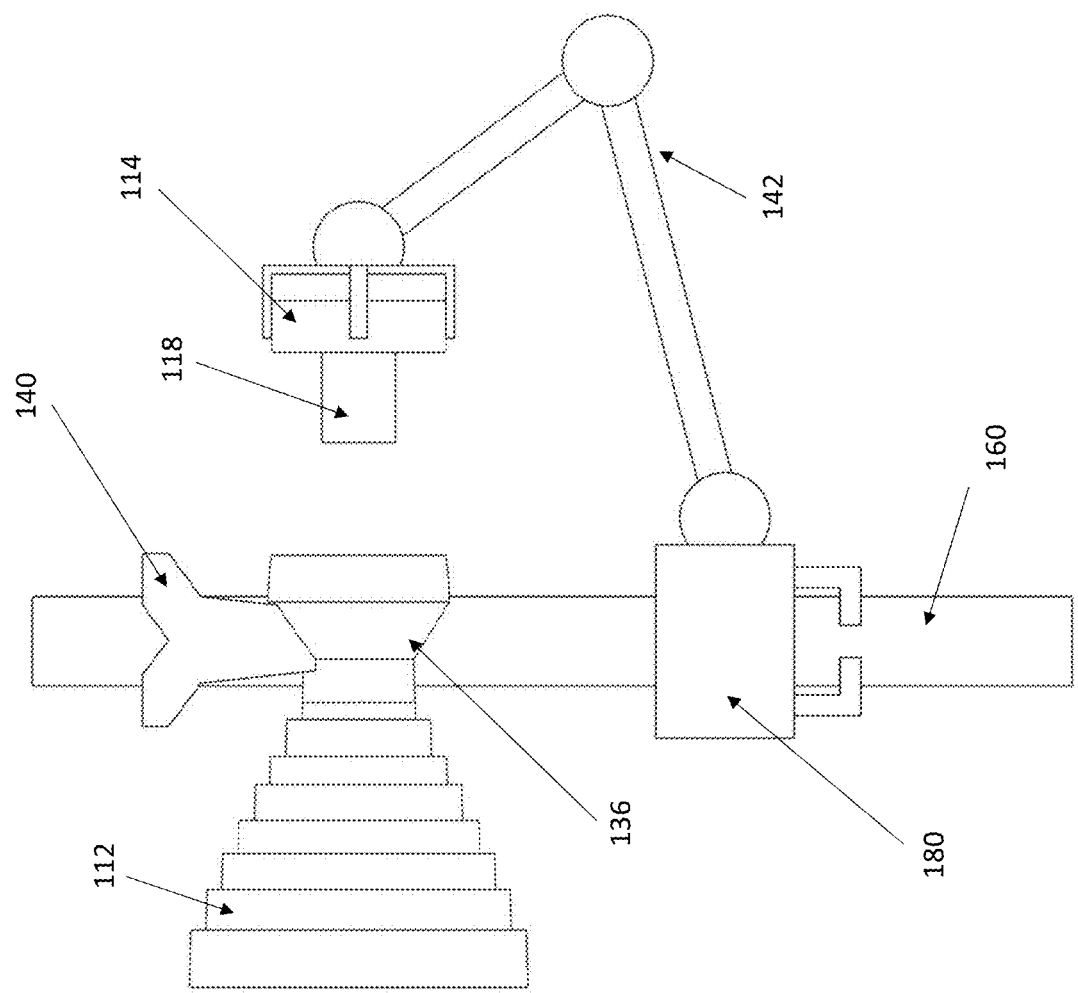
FIGS. 30-31 illustrate yet other exemplary embodiments of methods of assembling a radio and/or a horn antenna to the assembly of FIG. 16, 18, 20, or 22.
Figure 31:
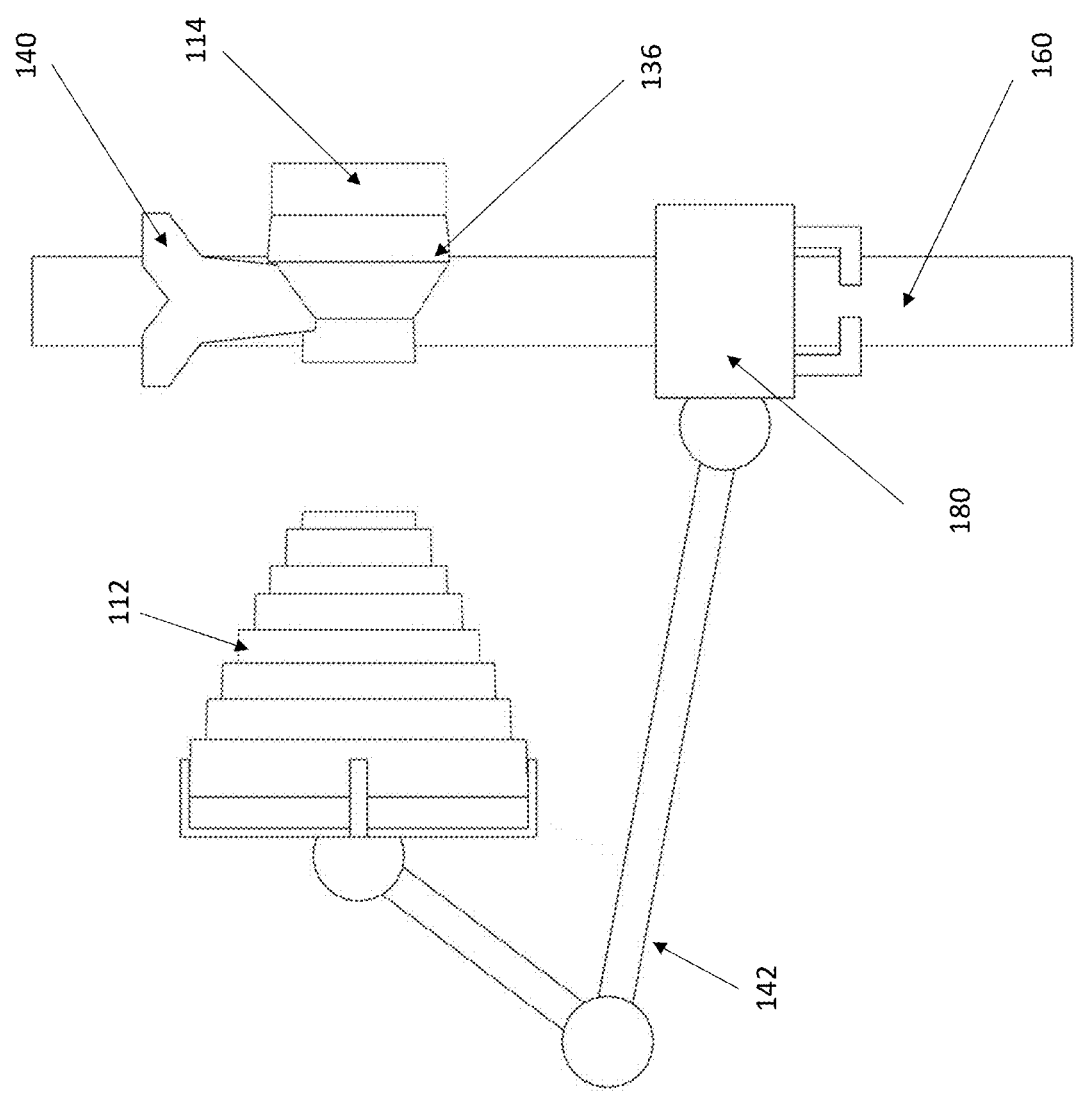

In FIGS. 30 and 31, radio 114 and horn antenna 112 are shown being installed or removed with a stationary robotic drone 180 equipped with one or more robotic arms 142. Here, bracket 140 is secured to a structure 160 and drone 180 is positioned on the structure so as to install/remove the radio 114 and/or antenna 112.

Figure 32:
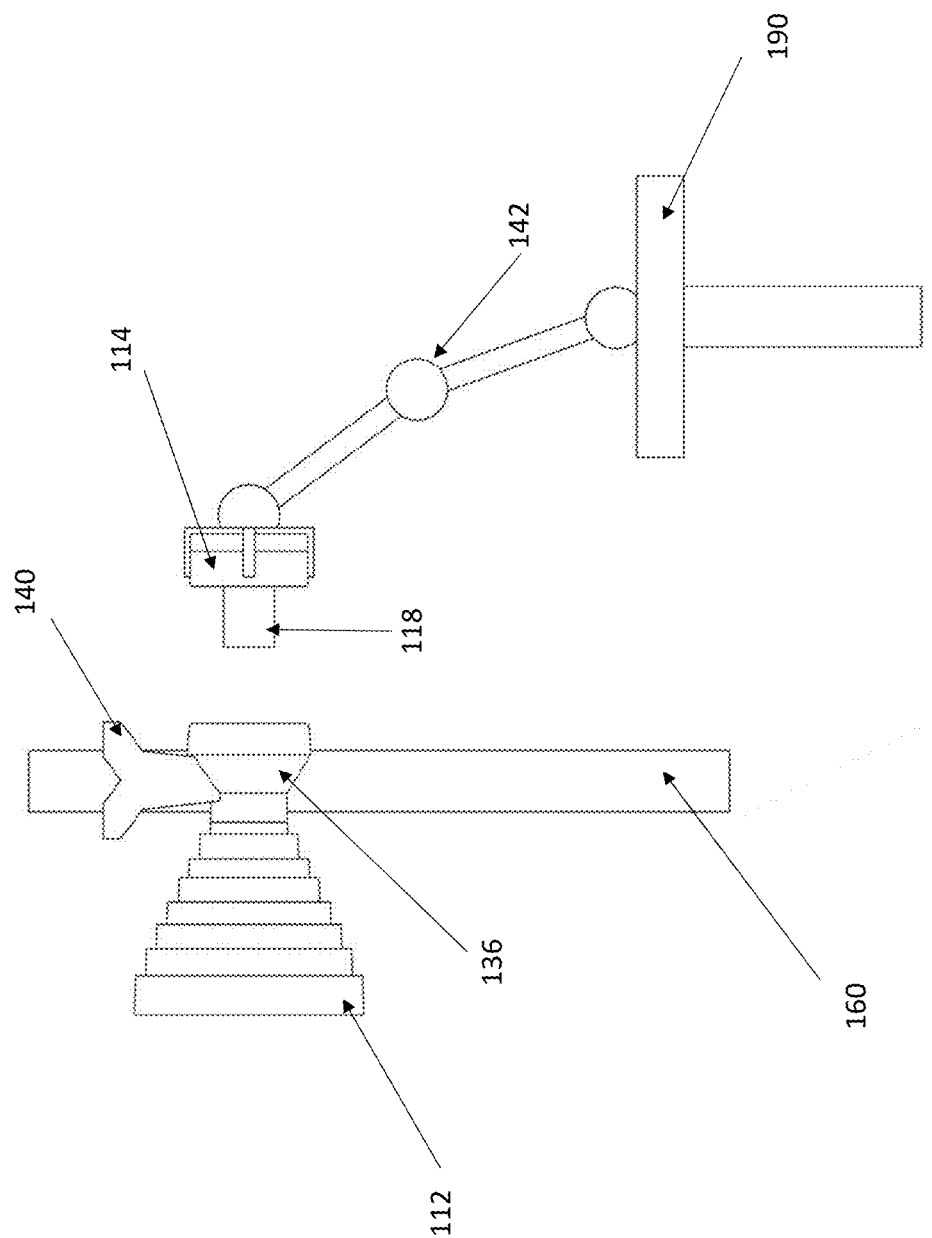
FIGS. 32-33 illustrate still yet other exemplary embodiments of methods of assembling a radio and/or a horn antenna to the assembly of FIG. 16, 18, 20, or 22.
Figure 33:
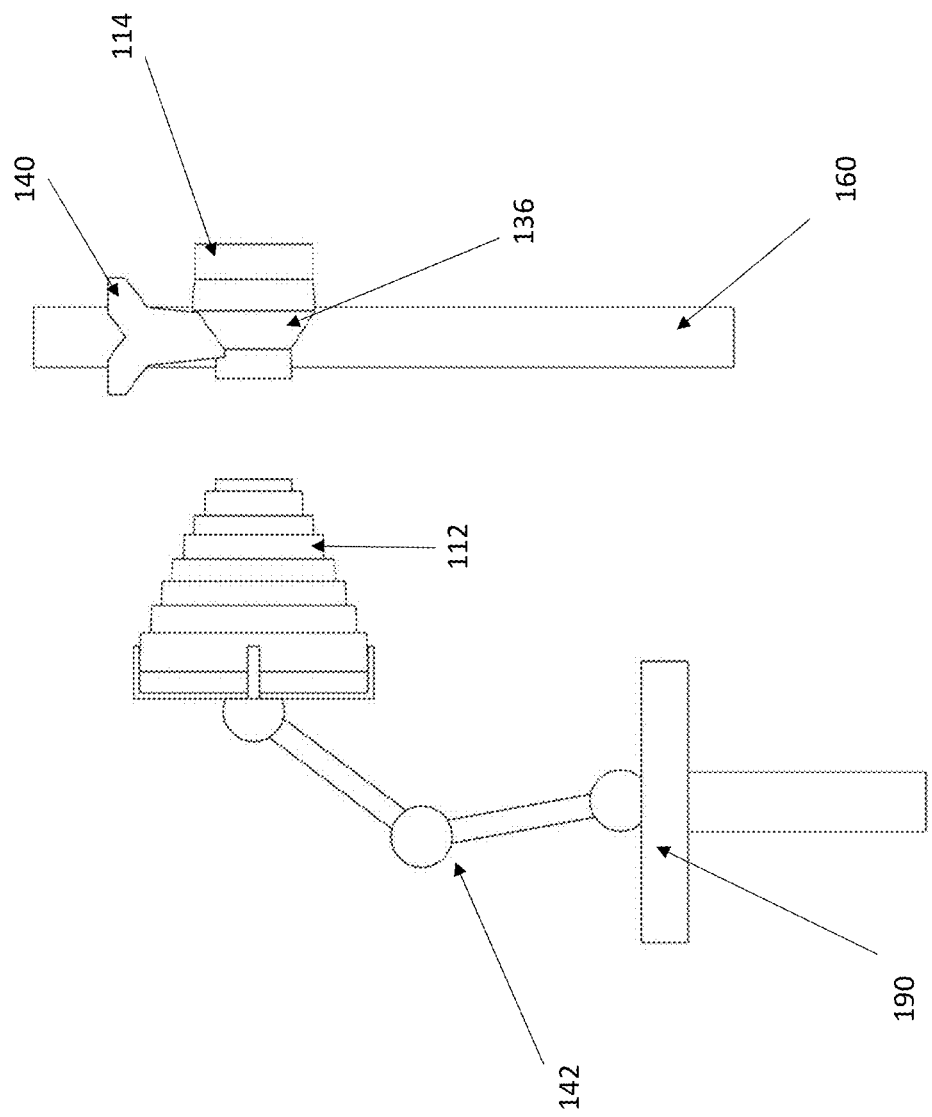

In FIGS. 32 and 33, radio 114 and horn antenna 112 are shown being installed or removed with an elevatable drone 190 equipped with one or more robotic arms 142. Here, bracket 140 is secured to a structure 160 and drone 190 is positioned on the ground, then elevated or raised and once raised to the desired height is operated to install/remove the radio 114 and/or antenna 112.

Figure 34:
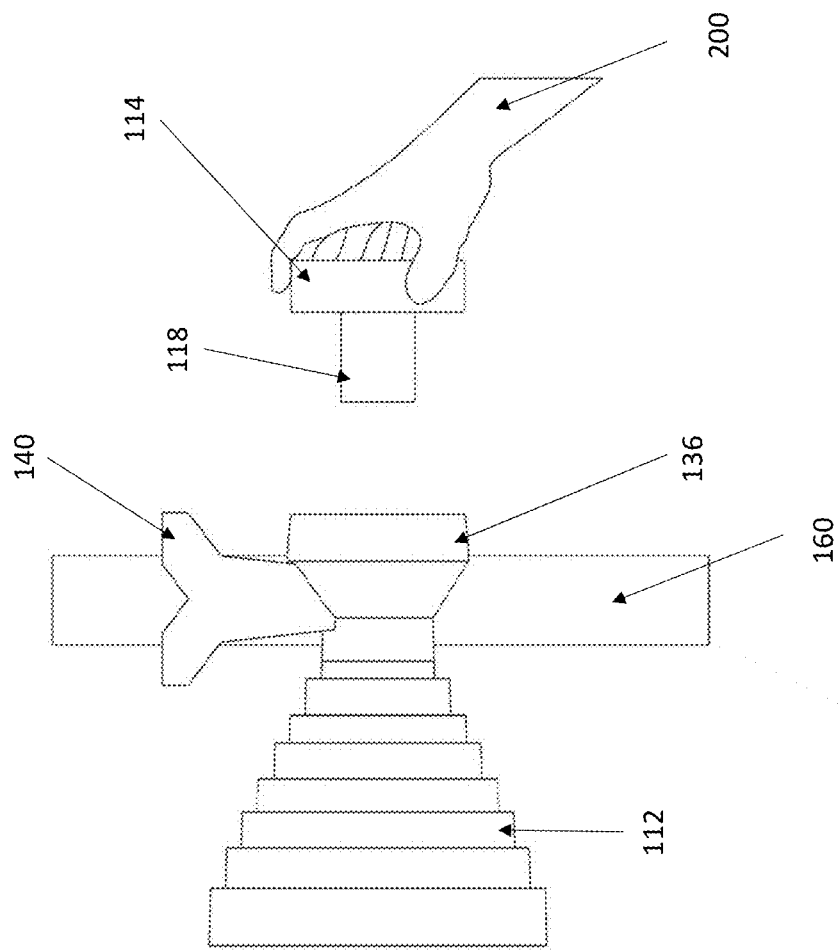
FIGS. 34-35 illustrate even more exemplary embodiments of methods of assembling a radio and/or a horn antenna to the assembly of FIG. 16, 18, 20, or 22.
Figure 35:
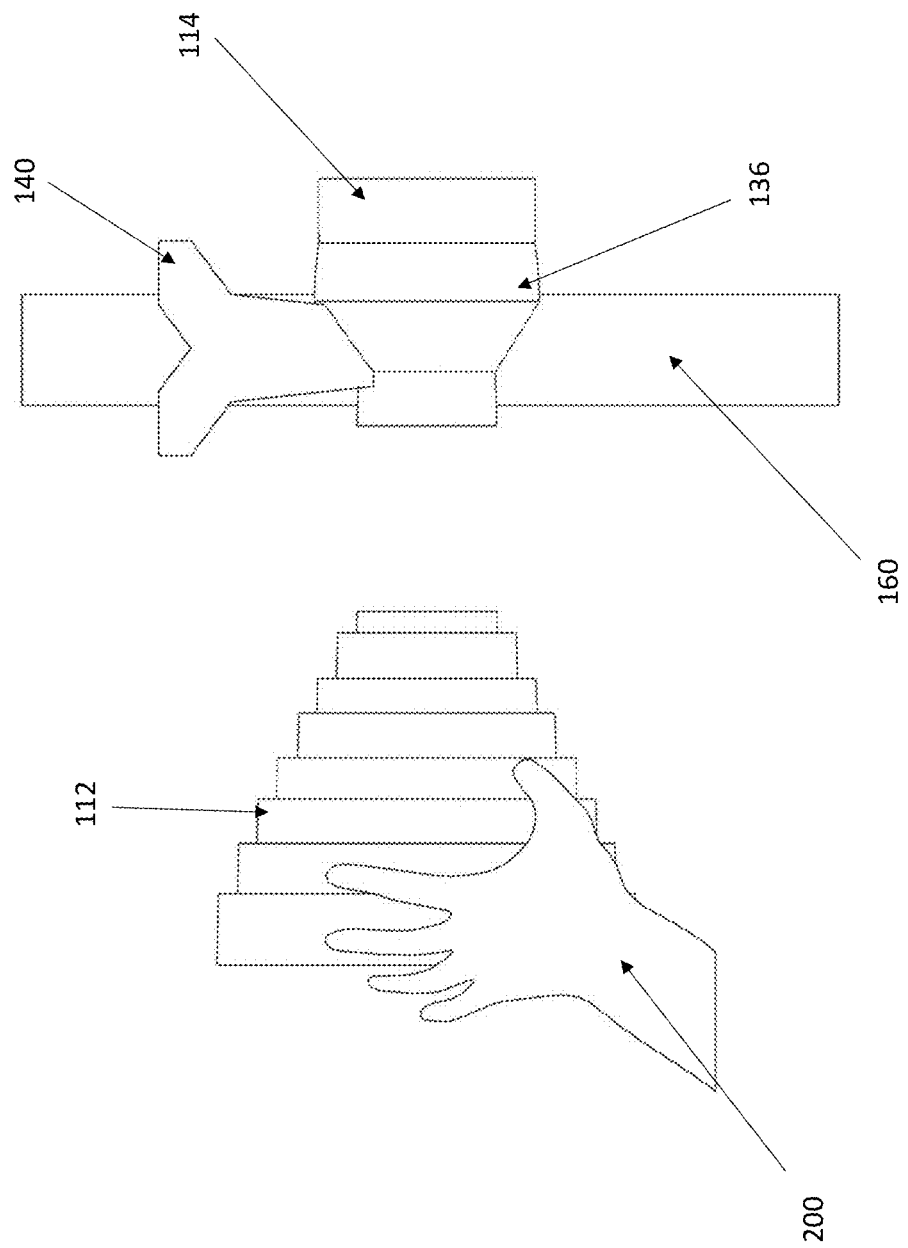

In FIGS. 34 and 35, radio 114 and horn antenna 112 are shown being manually installed or removed by an operator 200.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

| PARTS LIST | |
| --- | --- |
| modular antenna assembly 10 | circuit board 128 |
| antenna 12 | pair of couplings 130-1, 130-2 |
| transmitter 14 | power feed 132 |
| waveguide 16 | data feed 134 |
| waveguide portion 18 | power connectors 132-1 |
| waveguide portion 20 | data connectors 134-1 |
| closed end 22 | parabolic dish antenna 112' |
| antenna portion 23 | bracket 140 |
| open end 24 | robotic arm 142 |
| cover 26 | aerial drone 144 |
| circuit board 28 | pre-wired radio 14' |
| coupling 30 | power cables 32' |
| power feed 32 | data cables 34' |
| data feed 34 | single feed 150 |
| power connectors 32-1 | single connectors 150-1 |
| data connectors 34-1 | separate connectors 150-1, 150-2 |
| modular antenna assembly 110 | structure 160 |
| antenna 112 | perch 162 |
| transmitter 114 | feet 164 |
| base 136 | climbing robotic drone 170 |
| waveguide 116 | stationary robotic drone 180 |
| waveguide portion 118 | elevatable drone 190 |
| waveguide portion 120 | operator 200 |
| closed end 122 | |
| antenna portion 123 | |
| open end 124 | |
| central portion 138 | |
| cover 126 | |

What is claimed is:

1. A modular electromagnetic antenna assembly configured for securement to a structure, comprising:
    a radio having one or more second power and/or data connectors; and
    a base having a bracket securable to the structure, the base having a first end with a first coupling, the first coupling having one or more first power and/or data connectors,
    wherein the radio and base together form a waveguide that transmits radio waves from the radio, and
    wherein the radio is removably secured to the first coupling so as to form a removable mechanical connection to the base and a removable communication connection between the one or more first and second power and/or data connectors.

2. The assembly of claim 1, further comprising an antenna at a second end of the base, wherein the waveguide that transmits radio waves between the radio and the antenna.

3. The assembly of claim 2, wherein the antenna further comprises a portion that together with the radio and base forms the waveguide.

4. The assembly of claim 2, wherein the antenna comprises a parabolic dish antenna having an open end opposite the base.

5. The assembly of claim 4, wherein the open end further comprises a cover that is transparent to radio waves.

6. The assembly of claim 2, wherein the antenna comprises a horn antenna having an open end opposite the base.

7. The assembly of claim 6, wherein the open end further comprises a cover that is transparent to radio waves.

8. The assembly of claim 2, wherein the base further comprises a second coupling at the second end, the antenna being removably secured to the second coupling.

9. The assembly of claim 8, wherein the first and second couplings are identically structured.

10. The assembly of claim 8, wherein the first and second couplings are differently structured.

11. The assembly of claim 1, further comprising at least one feed coupled directly to the base and in communication with the one or more first power and/or data connectors.

12. The assembly of claim 11, wherein the at least one feed comprises an electrical feed, a data feed, one or more direct current electrical feeds, one or more data feeds, one or more fiber optic data feeds, and any combinations thereof.

13. The assembly of claim 1, wherein the base and/or the radio comprises circuitry for conversion of a fiber optic data signal to an electrical data signal.

14. A method of assembling a modular electromagnetic antenna assembly, comprising:
mechanically securing a base on a structure, the base having a first end with a first coupling, the first coupling having one or more first power and/or data connectors; and
removably securing a radio to the base so that the radio and the base together form a waveguide that transmits radio waves from the radio and so that one or more second power and/or data connectors of the radio is in communication with the one or more first power and/or data connectors.

15. The method of claim 14, wherein the step of securing the radio to the first coupling comprises controlling a drone to install the radio to the base.

16. The method of claim 14, further comprising coupling at least one feed directly to the base and in communication with the one or more first power and/or data connectors.

17. The method of claim 16, wherein the at least one feed comprises an electrical feed, a data feed, one or more direct current electrical feeds, one or more data feeds, one or more fiber optic data feeds, and any combinations thereof.

18. The method of claim 14, further comprising securing an antenna to a second coupling at a second end of the base so that the waveguide transmits radio waves between the radio and the antenna.

19. The method of claim 18, wherein the step of removably securing the radio to the second coupling further comprises securing the radio and the base so that a portion of the antenna together with the radio and the base form the waveguide.

20. The method of claim 18, wherein the step of securing the antenna to the second coupling comprises controlling a drone to install the antenna to the second end.

* * * * *